US012730830B2

(12) United States Patent
Nabel

(10) Patent No.: US 12,730,830 B2
(45) Date of Patent: Sep. 8, 2026

(54) LARGE LANGUAGE MODEL INTERACTIONS VIA INTELLIGENT PROMPT ENRICHMENT MODULE AND UPDATED PROFILE

(71) Applicant: RIOT GAMES, INC., Los Angeles, CA (US)

(72) Inventor: Dan David Nabel, Santa Monica, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 0 days.

(21) Appl. No.: 18/654,344

(22) Filed: May 3, 2024

(65) Prior Publication Data

US 2025/0342182 A1 Nov. 6, 2025

(51) Int. Cl.

*G06F 16/00* (2019.01)
*A63F 13/40* (2014.01)
(Continued)

(52) U.S. Cl.

CPC .......... *G06F 16/3329* (2019.01); *A63F 13/40* (2014.09); *G06F 16/3322* (2019.01);
(Continued)

(58) Field of Classification Search

CPC ............. G06F 16/3329; G06F 16/3322; G06F 40/284; G06F 40/30; H04L 67/306; A63F 13/40
(Continued)

(56) References Cited

U.S. PATENT DOCUMENTS 8,321,295 B1 11/2012 Myslinski
9,053,427 B1 6/2015 Myslinski
(Continued)

FOREIGN PATENT DOCUMENTS

CA 2913669 A1 12/2015
CN 103218288 B 7/2017
(Continued)

OTHER PUBLICATIONS

Chen et al., "GRATH: Gradual Self-Truthifying for Large Language Models", Available online at: <https://arxiv.org/html/2401.12292v2>, Jan. 31, 2024, 17 pages.
(Continued)

*Primary Examiner* — Raquel Perez-Arroyo
(74) *Attorney, Agent, or Firm* — Shook, Hardy & Bacon L.L.P.

(57) ABSTRACT

Various embodiments of the technology described programmatically access a user query intended for a Large Language Model (LLM), analyze the user query, and determine prompt-enriching information that is combined with the user query to generate an enriched user query that is ultimately communicated to the LLM. In this manner, additional prompt-enriching information or context is added to the user query before being communicated to the LLM so that the additional prompt-enriching information, along with the user query, can be tokenized to better guide the LLM to a more accurate answer without modifying weights, parameters, or training of the LLM. Certain embodiments have the technical effect of improved accuracy relative to existing approaches by enriching user queries with prompt-enriching information to generate an enriched user query that is passed to the LLM. Based on the enriched user query, certain embodiments reduce the likelihood of hallucinations present in the LLM response.

20 Claims, 11 Drawing Sheets

(51) Int. Cl.

| | |
|---|---|
| ***G06F 16/332*** | (2019.01) |
| ***G06F 16/3329*** | (2025.01) |
| ***G06F 40/284*** | (2020.01) |
| ***G06F 40/30*** | (2020.01) |
| ***H04L 67/306*** | (2022.01) |

(52) U.S. Cl.
CPC ............ *G06F 40/284* (2020.01); *G06F 40/30* (2020.01); *H04L 67/306* (2013.01)

(58) Field of Classification Search
USPC .......................................................... 707/713
See application file for complete search history.

(56) References Cited

U.S. PATENT DOCUMENTS

| | | | |
|---|---|---|---|
| 9,189,514 | B1 | 11/2015 | Myslinski |
| 2013/0151240 | A1 | 6/2013 | Myslinski |
| 2013/0151463 | A1 | 6/2013 | Ritter et al. |
| 2014/0317101 | A1 | 10/2014 | Myslinski |
| 2016/0045829 | A1 | 2/2016 | Myslinski |
| 2016/0140445 | A1 | 5/2016 | Adderly et al. |
| 2017/0262754 | A1 | 9/2017 | Mizuno et al. |
| 2018/0330260 | A1 | 11/2018 | Bao et al. |
| 2019/0291011 | A1 * | 9/2019 | Benedetto ............... A63F 13/86 |
| 2020/0126116 | A1 | 4/2020 | Smith et al. |
| 2020/0143268 | A1 | 5/2020 | Hayashi et al. |
| 2020/0160196 | A1 | 5/2020 | Ramakrishnan et al. |
| 2020/0202073 | A1 | 6/2020 | Ghulati |
| 2020/0202074 | A1 | 6/2020 | Ghulati |
| 2020/0356615 | A1 | 11/2020 | Galuten |
| 2021/0011922 | A1 | 1/2021 | Benger |
| 2021/0335366 | A1 | 10/2021 | Keiter et al. |
| 2024/0289363 | A1 * | 8/2024 | Qadrud-Din .......... G06F 40/289 |
| 2025/0045314 | A1 * | 2/2025 | Madnani ............. G06F 16/3329 |
| 2025/0272506 | A1 * | 8/2025 | Sassak, Jr. .............. G06F 40/35 |
| 2025/0334420 | A1 * | 10/2025 | Yankov ................... G06F 40/20 |

FOREIGN PATENT DOCUMENTS

| | | | |
|---|---|---|---|
| CN | 110046200 | A | 7/2019 |
| CN | 113886140 | A | 1/2022 |
| CN | 116401339 | A | 7/2023 |
| CN | 116611431 | A | 8/2023 |
| JP | 2017-162050 | A | 9/2017 |
| JP | 6829426 | B2 | 2/2021 |
| JP | 7206304 | B2 | 1/2023 |
| WO | 2019/043379 | A1 | 3/2019 |
| WO | 2023/088278 | A1 | 5/2023 |

OTHER PUBLICATIONS

Liu et al., "Tuning Language Models by Proxy", Available online at: <https://arxiv.org/abs/2401.08565>, Apr. 15, 2024, 24 pages.
Zhang et al., "Alleviating Hallucinations of Large Language Models through Induced Hallucinations", Available online at: <https://arxiv.org/abs/2312.15710>, Mar. 11, 2024, 15 pages.

* cited by examiner

500

600

RECEIVE, FROM A USER DEVICE AND IN ASSOCIATION WITH A USER PROFILE, AN INPUT COMPRISING A USER PROMPT INTENDED FOR A LARGE LANGUAGE MODEL (LLM) ~602

DETERMINE, FROM THE USER PROMPT, PROMPT-ENRICHING INFORMATION COMPRISING AT LEAST ONE OF: A FIRST INDICATION OF A LOGICAL ASSESSMENT OF THE USER PROMPT, A SECOND INDICATION OF A FACTUAL ASSESSMENT OF THE USER PROMPT, A THIRD INDICATION OF AN INTENT OF THE USER PROMPT, A FOURTH INDICATION OF A COMPARISON OF THE USER PROMPT TO A DATABASE COMPRISING DATA FOR A PLURALITY OF USERS, OR A FIFTH INDICATION OF HISTORICAL TRENDS ASSOCIATED WITH THE USER PROFILE ~604

APPEND THE PROMPT-ENRICHING INFORMATION AND THE USER PROMPT TO GENERATE AN ENRICHED USER QUERY ~606

TRANSMIT THE ENRICHED USER QUERY TO THE LLM ~608

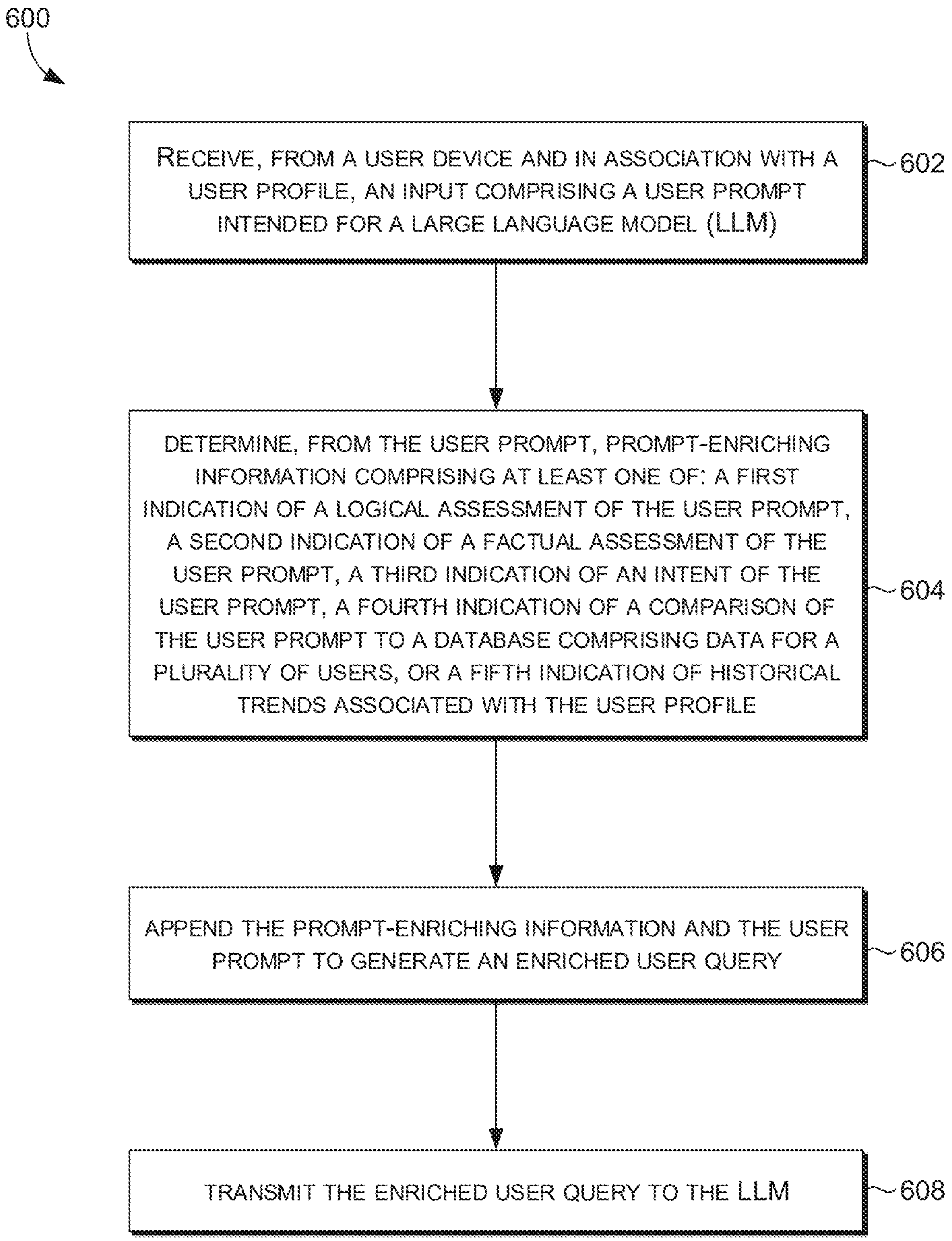

*FIG. 6*

RECEIVING, IN ASSOCIATION WITH A USER PROFILE, AN INPUT COMPRISING A USER QUERY INTENDED FOR A LANGUAGE MODEL (LM) ~802

IN LIEU OF COMMUNICATING THE USER QUERY TO THE LM, DETERMINE, FROM THE USER QUERY, PROMPT-ENRICHING INFORMATION COMPRISING AT LEAST ONE OF: A FIRST INDICATION OF A LOGICAL ASSESSMENT OF THE USER QUERY, A SECOND INDICATION OF A FACTUAL ASSESSMENT OF THE USER QUERY, A THIRD INDICATION OF AN INTENT OF THE USER QUERY, A FOURTH INDICATION OF A COMPARISON OF THE USER QUERY TO A DATABASE COMPRISING DATA FOR A PLURALITY OF USERS, OR A FIFTH INDICATION OF HISTORICAL TRENDS ASSOCIATED WITH THE USER PROFILE ~804

IN LIEU OF COMMUNICATING THE USER QUERY TO THE LM, COMBINE THE USER QUERY AND THE PROMPT-ENRICHING INFORMATION TO GENERATE AN ENRICHED USER QUERY ~806

TRANSMIT THE ENRICHED USER QUERY TO THE LM ~808

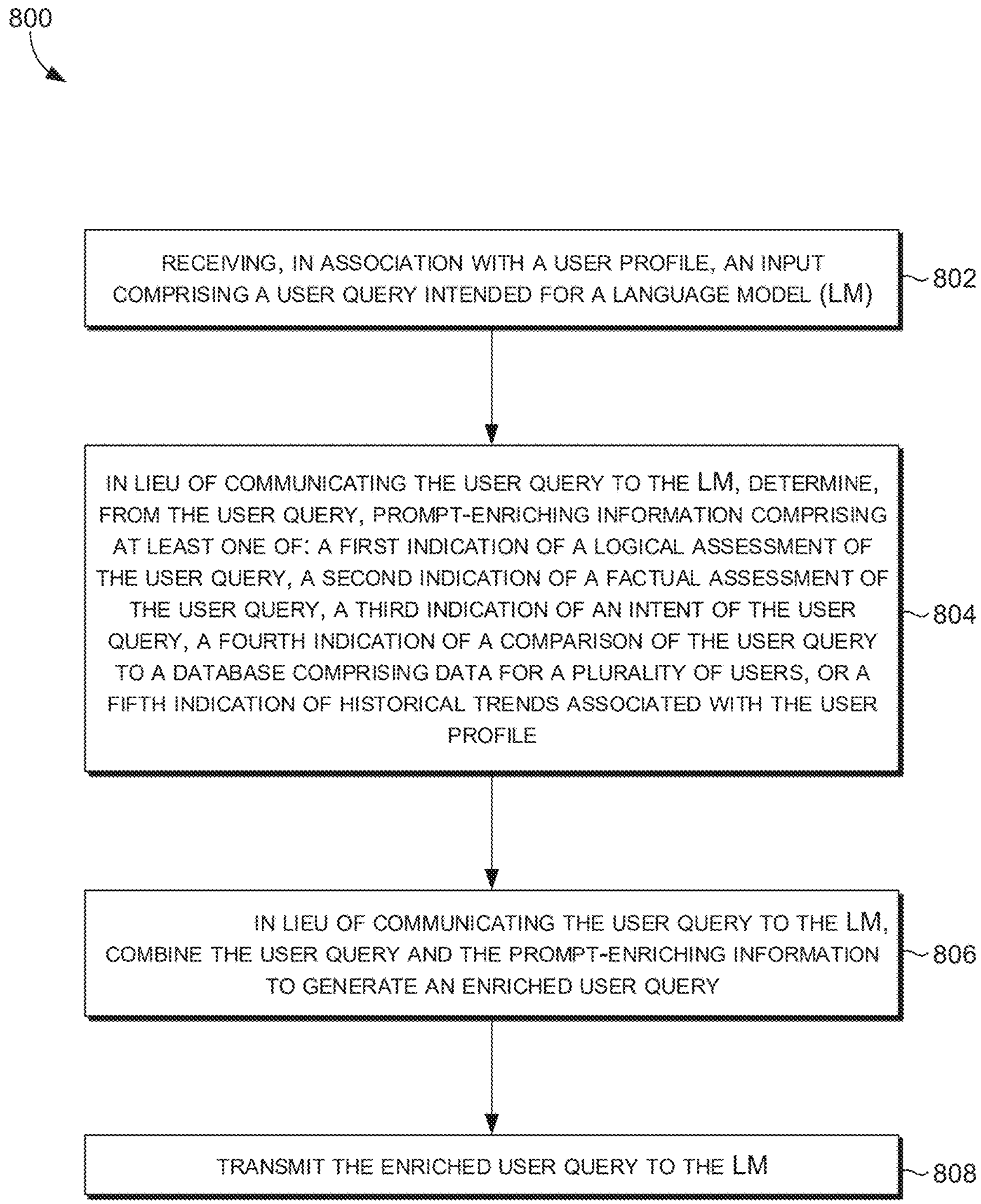

*FIG. 8*

LARGE LANGUAGE MODEL INTERACTIONS VIA INTELLIGENT PROMPT ENRICHMENT MODULE AND UPDATED PROFILE

BACKGROUND

Computational linguistics, also known as Natural Language Processing (NLP), is a computer-based technique to understand, learn, and/or generate natural human language content. Recent advances in NLP technologies use sophisticated language models to derive a rich understanding of natural language. For example, some language models engage in generation of content, such as textual content, based on text inputs.

Natural Language Generation (NLG) is one of the crucial yet challenging sub-fields of NLP. NLG techniques are used by certain language models, such as large language models (LLMs), in many downstream tasks such as text summarization, dialogue generation, generative question answering (GQA), data-to-text generation, and machine translation. However, these and other models are prone to certain issues. First, certain language models, such as LLMs, blindly consume a user input submitted as a prompt to the model irrespective of the credibility of the user input. Second, certain language models are prone to "hallucination," which refers to the generation of text that is nonsensical, unfaithful to the provided source input, or is otherwise incorrect. Hallucinations may increase as users employ nefarious prompt engineering techniques aimed at causing hallucinations or otherwise "tricking" the LLM. In the context of video games leveraging LLMs, certain users may try to "trick" the LLM to cause the LLM to hallucinate in order to cheat the video game. Hallucination is concerning because it hinders model performance, such as accuracy, especially when the desired output is complicated.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein programmatically access a user prompt intended for a Large Language Models (LLM), analyze content of the user prompt, and determine prompt-enriching information that is combined with the user prompt to generate an enriched user query that is ultimately communicated to the LLM. In this manner, additional prompt-enriching information is added to the user prompt before being communicated to the LLM so that the additional prompt-enriching information can better guide the LLM to a more accurate answer without modifying the LLM itself. Example additional prompt-enriching information includes a first indication of a logical assessment of the user prompt, a second indication of a factual evaluation of the user prompt, a third indication of an intent of the user prompt, a fourth indication of a comparison of the user prompt to a database comprising user data, and a fifth indication of historical data indicative of historical trends associated with the user profile.

Embodiments disclosed herein further modify certain databases or user data based on a response from the LLM. As a first example, suppose an LLM response indicates that a portion of the user prompt is factually incorrect. Certain embodiments consume the response from the LLM to update a database containing historical data indicative of historical trends associated with the user profile, such that the update to the database indicates that the user lied about a subject associated with the portion of the user prompt that was factually incorrect. As a second example, suppose that the LLM indicates that the user prompt indicated a new fact about another user. In this example, certain embodiments consume the response from the LLM to update the database containing user information so that a data structure associated with the other user includes the new fact. In this manner, future analysis of user input can be improved based on this iteratively modified or updated data contained in certain databases.

Among other benefits, this technical solution enriches user inputs using technical frameworks to ensure more realistic outputs from the LLM, making interactions more lifelike and realistic, due to the LLM response giving an impression of heightened critical reasoning and logic skills that have some measure enriched contextualized understanding based on past experiences. The present disclosure provides one or more technical solutions that have technical effects in light of various technical problems. For example, particular embodiments have the technical effect of improved accuracy relative to existing LLMs by enriching user prompts with prompt-enriching information to generate an enriched user query that is passed to the LLM. Based on the enriched user query, certain embodiments reduce the likelihood of hallucinations present in the output from the LLM. Whereas existing approaches blindly pass a user prompt to an LLM or modify an output of the LLM, certain embodiments disclosed herein modify an input to the LLM to include specific prompt-enriching information, thereby reducing the need for post-processing of the LLM output. Aspects of this technology are performed by an intermediate language model (LM) interface layer between a client interface layer and an LLM layer, leaving an existing LLM unmodified in one embodiment. In this manner, certain embodiments reduce or altogether eliminate computational resource utilization associated with post-processing an output from an LLM.

Particular embodiments have the technical effect of causing LLMs to create new data, responsive to a user prompt and based on the existing data, without a user having to specify the specific new data to be created. For example, particular embodiments have the technical effect of causing the LLM to generate computer instructions causing the underlying data to be processed and/or updated while being responsive to the user prompt. In this manner, a database used to facilitate analysis of the user prompt can be accessed and updated with information contained in the LLM response to maintain an up-to-date repository of data used to analyze user prompts, which certain existing language models do not do. Additionally, certain embodiments have the technical effect of increasing scalability, allowing computing systems to accommodate more user prompts input into an LLM by offloading computations from the LLM to an intermediate LM layer or an endpoint associated with an application programming interface (API).

BRIEF DESCRIPTION OF THE DRAWINGS

The present disclosure is described in detail below with reference to the attached drawing figures, wherein:

FIG. 6 depicts a flow diagram of a method for programmatically determining prompt-enriching information and combining the prompt-enriching information and a user prompt to generate an enriched user query that is passed to the LLM, in accordance with an embodiment of the present disclosure;

FIG. 8 depicts a flow diagram of a method for programmatically determining prompt-enriching information and combining the prompt-enriching information and a user prompt to generate an enriched user query that is passed to the LLM to generate an LLM response, in accordance with an embodiment of the present disclosure;

DETAILED DESCRIPTION

Figure 1:
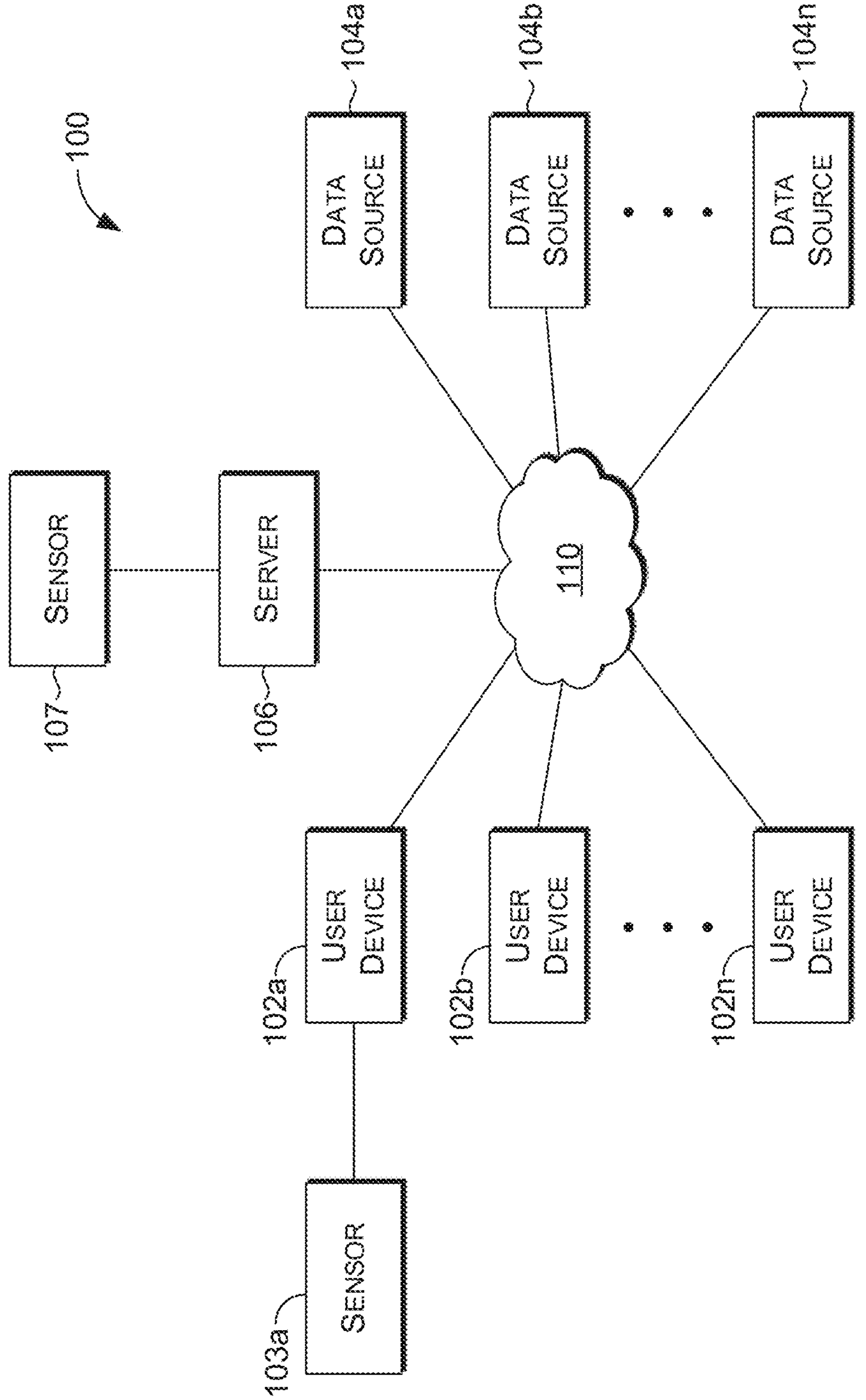
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, this disclosure contemplates that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Various embodiments discussed herein programmatically expand the capabilities of computing systems by enriching a user prompt with prompt-enriching information to generate an enriched user query that is passed to a Large Language Model (LLM), enabling LLMs to produce outputs with improved accuracy and reduced likelihood of hallucination. As used herein in one example, "user prompt," "prompt," "input to an LLM," "user query," or "LLM prompt" refers to a string of characters or symbols forming a natural language statement indicative of a request or command intended for consumption by the LLM. In certain embodiments, the user prompt is translated or converted into tokens that are consumed by the LLM. "Tokens" generally refers to numerical representations or other identifiers that are organized into vectors or other numerical structures that are formatted for consumption by the LLM. For example, the phrase "generate a phrase!" includes sixteen total characters and the following four tokens: (1) "generate" (2) "a" (3) "phrase" (4) "!". Certain embodiments translate a user prompt into tokens via a process called tokenization. "Tokenization," in one example, refers to a process of breaking down a collection of text into smaller units called "tokens" that facilitate LLMs in language understanding, generation, and translation.

Certain existing techniques for evaluating aspects of LLMs and attempting to identify hallucinations include techniques for analyzing an LLM output. One existing technique includes retrieval-augmented generation (RAG), which focuses on accuracy of LLM outputs. Certain RAG techniques include modifying an output from the LLM so that the output of the LLM references external data that was not included in the training data that was used to train the LLM. However, RAGs do not include logic or infrastructure for evaluating a user input to improve a user prompt. Indeed, certain RAG techniques fail to evaluate the input into the LLM, thereby leaving the LLM or other post-processing techniques to try to prevent hallucinations. As the number of user prompts that the LLM receives increases, certain RAGs slow-down LLM response time or reduce scaling capabilities, the improvement of which is difficult to achieve in certain technological contexts, such as gaming.

With this in mind, embodiments of the technology described herein programmatically access a user prompt intended for a Large Language Model (LLM), analyze the content contained in the user prompt, and determine prompt-enriching information that is combined with the user prompt to generate an enriched user query that is ultimately communicated to the LLM to improve verisimilitude. In this manner, additional prompt-enriching information is added to the input before being communicated to the LLM so that the additional prompt-enriching information can better guide the LLM to a more accurate answer without modifying the LLM itself. In some embodiments, the user prompt is converted to user tokens and the prompt-enriching information is converted to prompt-enriching tokens, such that the user tokens and the prompt-enriching tokens are combined to generate the enriched user query. Although certain embodiments are discussed in the context of LLMs, it should be understood that certain embodiments of this disclosure are applicable to other types of language models, artificial intelligence (AI)-based models, and neural networks.

In one example, "prompt-enriching information" refers to the circumstances, conditions, or other data that surrounds a particular event, situation, and/or statement associated with an initial prompt, providing a more robust framework for understanding and interpreting the initial prompt. In the context of a user prompt for an LLM, the prompt-enriching information includes preceding or concluding text or input that influences the LLM's response. Example additional prompt-enriching information includes a first indication of a logical assessment of the user prompt, a second indication of a factual assessment of the user prompt, a third indication of an intent of the user prompt, a fourth indication of a comparison of the user prompt to a database comprising user data, and a fifth indication of historical data indicative of historical trends associated with the user profile.

In one example, "verisimilitude" or "truthlikeness" is the notion that some propositions are closer to being true than other propositions. One problem of verisimilitude is the problem of articulating what it takes for one false statement (such as a user prompt) to be closer to the truth than another false statement (such as a user prompt). To improve determining or assessing verisimilitude of a user prompt, certain embodiments disclosed herein include a framework evaluator 220 configured to determine various aspects of the user query. Based on one or more aspects determined by the framework evaluator 220 of FIGS. 2 and 3, an indication of the verisimilitude is generated. The indication of the verisimilitude can include prompt-enriching information that is passed to the LLM to improve an LLM response.

The present disclosure provides one or more technical solutions that have technical effects in light of various technical problems. For example, particular embodiments have the technical effect of improved accuracy relative to existing LLMs by enriching user prompts with prompt-enriching information to generate an enriched user query that is passed to the LLM. In some embodiments, the user prompt is tokenized before being communicated to the LLM, thereby offloading some of the computational operations away from the LLM to allow the LLM to scale and service more user prompts.

Based on the enriched user query, certain embodiments reduce the likelihood of hallucinations present in the output from the LLM. Whereas existing approaches blindly pass a user prompt to an LLM or modify an output of the LLM, certain embodiments disclosed herein modify an input to the LLM with specific prompt-enriching information, thereby reducing the need for post-processing of the LLM output. Aspects of this technology are performed by an intermediate LM layer between a client interface layer and an LLM layer, leaving an existing LLM unmodified, in one embodiment. In some embodiments, computations performed by the LLM are instead performed by the LLM layer, thereby reducing computations performed by the LLM to allow the LLM to service more user prompts per unit of time. In this manner, certain embodiments reduce or altogether eliminate computational resource utilization associated with post-processing an output from an LLM.

Particular embodiments have the technical effect of causing LLMs to create new data, responsive to a user prompt and based on the existing data, without a user having to specify the specific new data to be created. For example, particular embodiments have the technical effect of causing the LLM to generate computer instructions causing the underlying data to be processed and/or updated while being responsive to the user prompt. In this manner, a database used to facilitate analysis of the user prompt can be accessed and updated with information contained in the LLM response to maintain an up-to-date repository of data used to analyze user prompts, which certain existing language models do not do. Additionally, certain embodiments have the technical effect of increasing scalability, allowing computing systems to accommodate more user prompts into an LLM by offloading computations from the LLM to an intermediate LM layer.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by circuitry, such as one or more processors, executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103*a* and 107; and network 110. It should be understood that the operating environment 100 shown in FIG. 1 is an example of one suitable operating environment. Each of the components shown in FIG. 1 is implemented via any type of computing device, such as computing device 900 illustrated in FIG. 9, for example. In one embodiment, these components communicate with each other via network 110, which includes, without limitation, one or more local area networks (LANs) and/or wide area networks (WANs). In one example, network 110 comprises the internet, intranet, and/or a cellular network (for example, 5G or 6G), amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing environment 1000 in FIG. 10. For instance, server 106 is provided via multiple devices arranged in a distributed environment that collectively provides the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. For example, user device 102*a* receives a prompt (for example, a language model prompt) that is communicated via network 110 to the server 106, and the server 106 runs the LLM to determine and generate a response to the prompt. As another example, server 106 can host video games for gameplay by user devices 102*a* and 102*b* through 102*n*. This division of operating environment 100 is provided to illustrate one example of a suitable environment, and there is no requirement for each implementation that any combination of server 106 and user devices 102*a* and 102*b* through 102*n* remain as separate entities.

In some embodiments, user devices 102*a* and 102*b* through 102*n* comprise any type of computing device capable of use by a user. For example, in one embodiment, user devices 102*a* and 102*b* through 102*n* are the type of computing device 900 described in relation to FIG. 9. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, an entertainment system, a vehicle computer system, an embedded system controller, a camera, a remote control, an appliance, a consumer electronic device, a workstation, a gaming device or system, a video game console, any other suitable computer device, or any combination of these delineated devices.

In some embodiments, data sources 104*a* and 104*b* through 104*n* comprise data sources and/or data systems, which are configured to make data available to any of the various constituents of operating environment 100 or system 200 described in connection to FIG. 2. For instance, one or more data sources 104*a* and 104*b* through 104*n* provide (or make available for accessing) data for a plurality of users, historical data indicative of historical trends associated with the user profile, and/or logic for determining prompt-enriching information from a user prompt. In one embodiment, one or more data sources 104*a* and 104*b* through 104*n* correspond to endpoints. Certain data sources 104*a* and 104*b* through 104*n* are discrete from user devices 102*a* and 102*b* through 102*n* and server 106 or are incorporated and/or integrated into at least one of those components. In one embodiment, one or more of data sources 104*a* and 104*b* through 104*n* comprise one or more sensors 103*a*, which are integrated into or associated with one or more of the user device(s) 102*a* and 102*b* through 102*n* or server 106. Examples of data made available by data sources 104*a* and 104*b* through 104*n* can include any suitable data made available to the intermediate LM layer 210 of FIG. 2. Example sensors 103*a* and 107 include accelerometers, capacitive touch sensors, proximity sensors, gyroscopes, cameras, and so forth.

Figure 2:
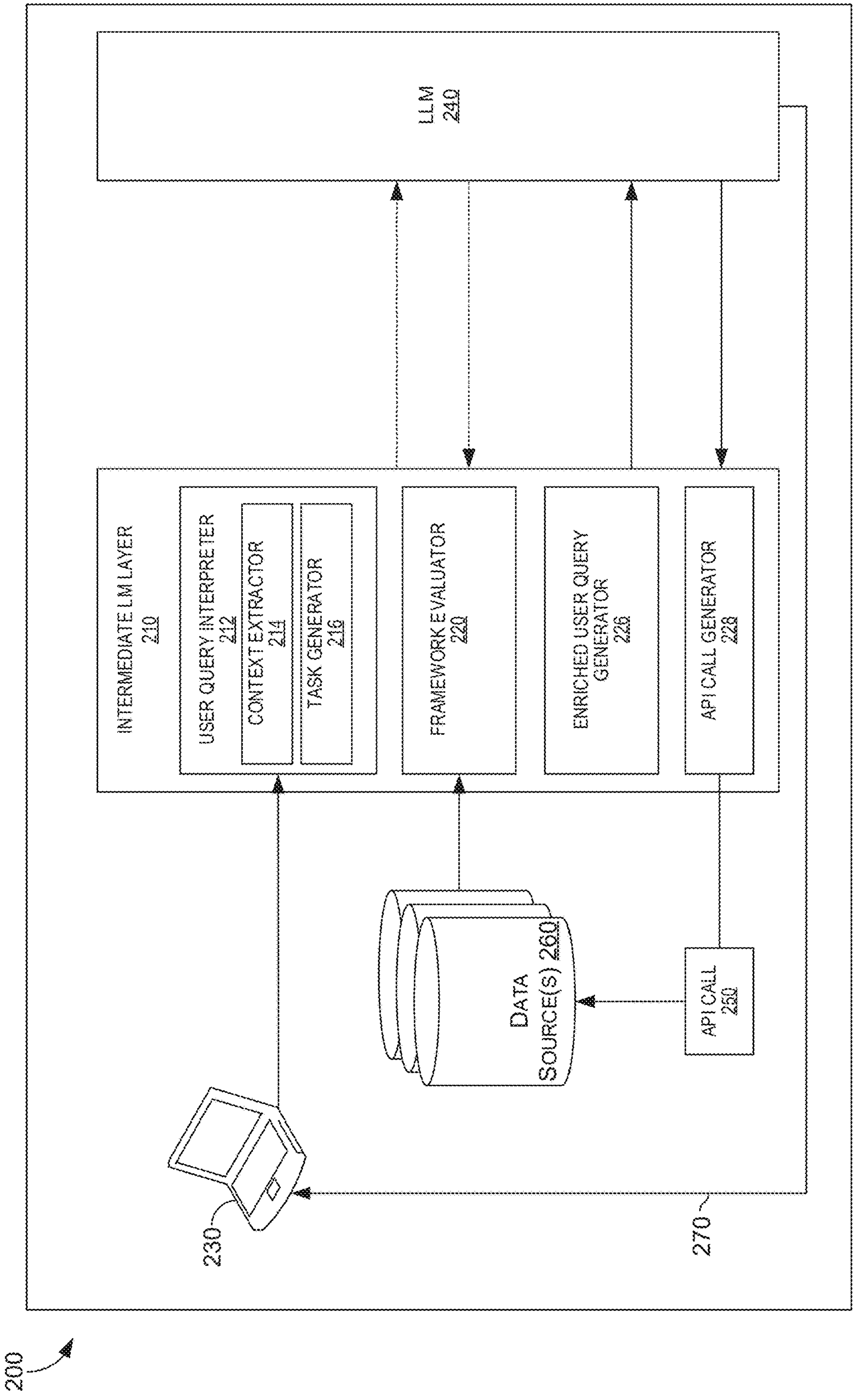
FIG. 2 is a block diagram of an example system including a large language model (LLM) interface layer positioned between a user device and a language model, in accordance with an embodiment of the present disclosure.

Operating environment 100 can be utilized to implement one or more of the components of system 200, as described in FIG. 2, to perform any suitable operations, such as receiving a user prompt, determining prompt-enriching information from the user prompt, combining the prompt-enriching information and the user prompt to generate an enriched user query, communicating the enriched user query to an LLM, and updating data sources based on the LLM response 270 (FIG. 2). Operating environment 100 can also be utilized for implementing aspects of methods 600, 700, and 800 in FIGS. 6, 7, and 8, respectively.

Referring now to FIG. 2, depicted is a block diagram of an example system 200 including an intermediate LM layer 210. The illustrated intermediate LM layer 210 includes a user query interpreter 212, including context extractor 214; framework evaluator 220; enriched user query generator 226; and an application programming interface (API) call generator 228. In some embodiments, the intermediate LM layer 210 is positioned between a user device 230 and an LLM 240, in accordance with an embodiment of the present disclosure. Example system 200 also includes an API call 250 and data source 260.

With reference to the intermediate LM layer 210, the user query interpreter 212 is generally responsible for receiving an input that includes a user prompt (also referred to in one example as an "initial prompt" or "user query") that is intended for the LLM 240 and determining information, such as an intent and contextual information, associated with the user prompt. In one example, a "prompt" as described herein includes one or more of: a request (for example, a question or instruction [for example, "what is the next quest in this video game campaign," or "write a list of all the locations in the primary map that I have visited"]), a query, target content, and one or more examples, as described herein. In some embodiments, the prompt is received as alphanumeric characters or as raw audio, to name a few non-limiting examples. In one example, "user prompt" or "initial prompt" refers to the prompt directly received from the user, and which is unaltered by the intermediate LM layer 210. In one embodiment, the initial prompt is not communicated directly to the LLM 240 and is instead processed by the intermediate LM layer 210 to generate one or more enriched user queries, as discussed herein.

In some embodiments, the user query interpreter 212 employs computing logic to infer an intent associated with an initial prompt. For example, the intent associated with the initial prompt is determined based on contextual information determined by the context extractor 214 of the user query interpreter 212. In some embodiments, context extractor 214 accesses user activity information and the initial prompt. Examples of user activity information include any suitable information associated with a user profile including user location; app usage; online activity; searches; communications such as chat, call, or any suitable user-communication item data (including, for example, the duration of chat session, topics of the chat session, and group members who were part of the chat session); types of communication items with which a user interacts; usage duration; application data (for example, video games, messages, posts, user statuses, notifications, and so forth); or nearly any other data related to user interactions with the user device or user activity via a user device. For example, a user's location is determined using GPS, indoor positioning system (IPS), or similar communication functionalities of a user device associated with a user.

Embodiments of the context extractor 214 utilize the user activity information and the initial prompt to determine contextual information, also referred to herein in one example as a "context," defining an intent associated with the initial prompt. As described herein, certain context (or context logic) is used to facilitate the intermediate LM layer 210 in determining an intent and corresponding tasks associated with the initial prompt, performing a factual assessment of the user prompt, and making a logical assessment of the user prompt, among other operations described herein. By way of example, a context comprises information about a user's current activity, such as application usage, application consumption time, communication or interaction during consumption of an application (for example, video game) or while interacting with an application, or other suitable interactions. For instance, a context indicates types of user activity, such as a user participating in a video game, such as performing a video game quest, sending a message, or viewing content. Alternatively, or in addition, a user can explicitly provide a context, such as performing a query for a particular topic or content, which is capable of being performed by engaging with a search tool or a particular video game entity, or by submitting the initial prompt intended for the LLM 240. In one embodiment, a context includes information about an initial prompt or related applications and operating system (OS) features with which the user is interacting or accessing information about—as in, where a user navigates gameplay to particular portions of a video game map or particular portions of a video game campaign.

In some embodiments, the context extractor 214 receives the user query from one or more sensors and/or computing devices associated with the user. In some embodiments, context extractor 214 determines interpretive data from the user query. In one example, interpretive data corresponds to data utilized by the components or subcomponents of system 200 that comprises an interpretation from processing raw data, such as a transcript extracted from raw audio associated with the user query, or topic information interpreted from the user query, and so forth. In one example, interpretive data is used to provide context to user queries or data accessible from data sources 260, which generally support determinations or inferences carried out by components of system 200. Moreover, it is contemplated that some embodiments of the disclosure utilize user queries alone or in combination with interpretive data for carrying out the objectives of the subcomponents described herein.

Some embodiments of context extractor 214 determine context related to a user action or activity events, such as people or entities identified in a user activity or related to the activity (for example, recipients of a message or entity associated with content requested from the LLM), and utilize a named-entity extraction model or named-entity recognition model. In some embodiments, context extractor 214 comprises one or more applications or services that parse or analyze information detected via one or more user devices used by the user and/or cloud-based services associated with the user to identify, extract, or otherwise determine a user-related or user device-related context. Alternatively, or in addition, some embodiments of context extractor 214 monitor user activity information. In some embodiments, this information comprises features (sometimes referred to herein as "variables") or other information regarding specific user-related activity and related contextual information. Some embodiments of context extractor 214 determine, from the monitored user activity data and the initial prompt, intent associated with the initial prompt based on the particular user, user device, or a plurality of users (such as a specific group of people, a group of people sharing a role within an organization, a group of gamers having similar rankings, an enterprise, and so forth), and/or user devices. In some embodiments, an intent determined by context extractor 214 is provided to other components of system 200 or stored in a user profile associated with a user.

Continuing with the intermediate LM layer 210, the task generator 216 is generally responsible for determining a task based on the intent and context determined by the user query interpreter 212. In some embodiments, the task generator 216 employs task determination logic to determine the task. In one embodiment, the task generator 216 receives data from the user query interpreter 212 (such as the user input into the prompt), corresponding context (from the context extractor 214), and an intent determined from the user input and the corresponding context. In some embodiments, the task generator 216 determines a task based on certain semantics contained in the user input. For example, the subject-verb arrangement of the intent is translated into a task.

To help illustrate, suppose a user submits a user prompt containing the following user query: "now that I have obtained the secret star-shaped key from the neighboring municipality, can the gate be unlocked?" Based on this user query, embodiments of the intermediate LM layer 210 extract from the user query an intent and a task. In this example, the user query interpreter 212 intercepts this initial user prompt and determines at least one intent contained in this initial prompt. From each identified intent, an example task generator 216 determines corresponding tasks. In one embodiment, the intents are determined from the verbs in the prompt, such as "have," "obtained," "get," and "unlocked." For the intents in this example, a first intent is to "determine if user has obtained the secret star-shaped key," and a second intent is "to determine if the gate can be unlocked." The task generator 216 determines a first task, for example, "search the user profile to determine if the user has obtained the secret star-shaped key or traveled to the world below the city to obtain the secret star-shaped key." The task generator 216 determines a second task, in this example, "has user met the requirements for the gate to be unlocked." The task generator 216 determines a third task, for example, "generate a response for the user." As illustrated by this example, embodiments of the task generator 216 translate the intent determined by the user query interpreter 212 into at least one task. In some embodiments, the task generator 216 communicates the output from the user query interpreter 212 to the framework evaluator 220 or any other component of system 200.

In some embodiments, the user query interpreter 212 leverages the LLM 240 to perform the functionality described with respect to the user query interpreter 212. For example, the enriched user query generator 226 submits the initial query to the LLM to determine context or at least one corresponding task. In some embodiments, the intermediate LM layer 210 includes an LLM separate from the LLM 240. For example, the framework evaluator 220 includes a respective LLM or other neural network-based architecture that generates an indication of verisimilitude and/or the prompt-enriching information, as discussed herein.

Continuing with the intermediate LM layer 210, the framework evaluator 220 is generally responsible for determining the prompt-enriching information. The illustrated framework evaluator 220 evaluates user assertions or tasks (from task generator 216 of FIG. 2) against a list of evidentiary rules or evaluations for "objections." In one example, an "objection" refers to an indication that a misrepresentation or error is detected in the user prompt based on an analysis by the framework evaluator 220. If framework evaluator 220 triggers an evidentiary rule and an "objection" is made, the framework evaluator 220 can access information from data sources or the user query interpreter 212 (such as the context determined by context extractor 214), and cause the enriched user query generator 226 to generate prompt-enriching information that is combined with the user prompt and communicated to the LLM 240. If framework evaluator 220 does not trigger an objection, the user prompt is not modified by the enriched user query generator 226 to cause the LLM 240 to respond to the original user query (for example, that has not been modified with prompt-enriching information).

In some embodiments, the prompt-enriching information is determined by at least one of: performing a logical assessment of the user prompt; performing a factual assessment of the user prompt; determining an intent of the user prompt; comparing the user prompt to global data, such as data for a plurality of users (for example, users playing a multi-player game similar to that of the user); or determining historical data indicative of historical trends associated with the user profile, such as whether the user often submits user prompts with an intent to cheat or get an unfair advantage. Additional components of the framework evaluator 220 are discussed in FIG. 3.

In one embodiment, framework evaluator 220 accesses or receives, and optionally accumulates, reformats, and/or combines, data discussed herein, for example, stored in one or more data stores, such as data sources 260, where it is available to other components of system 200. For example, certain user data is stored in or associated with a user profile. In some embodiments, any personally identifying data (for example, user data that specifically identifies particular users) is either not uploaded or otherwise provided from the one or more data sources, is not permanently stored, is de-identified, and/or is not made available to other components of system 200. In addition or alternatively, a user may opt into or out of services provided by the technologies described herein and/or select which user data and/or which sources' user data are to be captured and utilized by these technologies.

Figure 3:
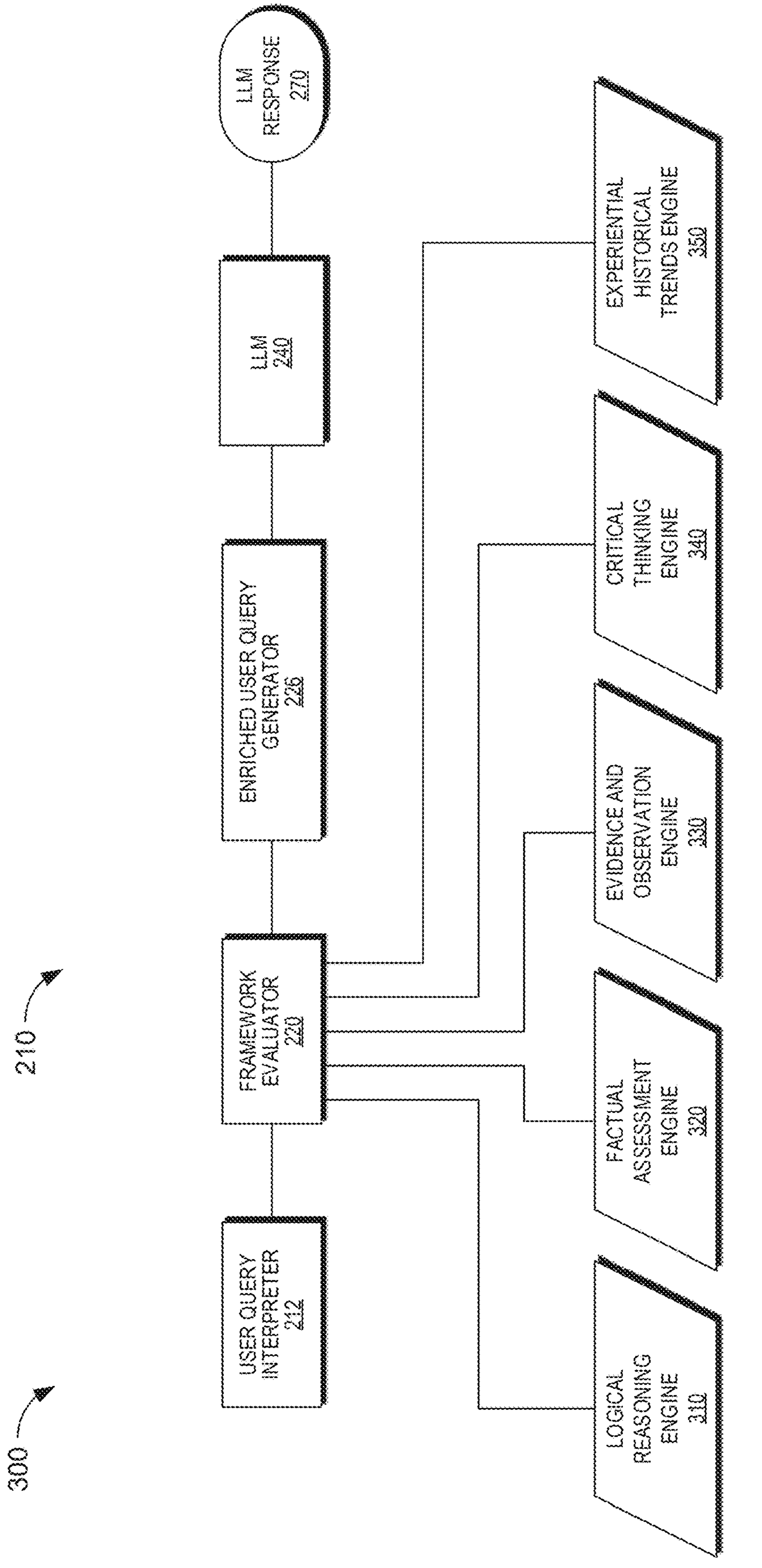
FIG. 3 is a block diagram of an example system for determining prompt-enriching information from a user query to generate an enriched user query, in accordance with an embodiment of the present disclosure.

In some embodiments, framework evaluator 220 receives the data discussed with respect to components of the framework evaluator 220 or otherwise the components of FIGS. 2 and 3 from a data source 260 (such as data source 104*a* in FIG. 1, which is, for example, a video game hosting site, a social networking site, an organization's intranet or file share, or other data source containing user data) or determined via one or more sensors (such as sensors 103*a* and 107 of FIG. 1), which are on or associated with one or more user devices (such as user device 102*a*), servers (such as server 106), and/or other computing devices. In one example, a sensor includes a function, routine, component, or combination thereof for sensing, detecting, or otherwise obtaining information such as user data from a data source 104*a*, and is generally embodied as hardware, software, or both.

To perform a search against data sources, embodiments of the framework evaluator 220 perform a search for the data set that is relevant to the user query (received by user query interpreter 212) or the tasks (generated by task generator 216). Certain embodiments of the framework evaluator 220 employ relevance logic to determine a data set that is relevant to the user query. In one embodiment, the intermediate LM layer 210 performs a semantic search for a data set (from data sources 260) associated with the task and/or intent extracted from the user input, among other operations. In some embodiments, the framework evaluator 220 performs a search for a data set based on the user query or a task extracted from the user query.

In one embodiment, the framework evaluator 220 performs a semantic analysis and is embodied as rules or a classification model that is employed by an LLM. As described herein in one example, a "semantic search" or "semantic analysis" refers to a search technique that extends traditional keyword-based searches to understand the meaning and context of the words used in a query. Instead of simply matching search terms, an example semantic search aims to comprehend the intent behind a user's query and deliver more relevant search results.

For example, a semantic search relies on natural language processing (NLP) and artificial intelligence (AI) implemented by an LLM to analyze the semantics, relationships, and context of words and phrases in documents or web pages. In one embodiment, the framework evaluator 220 includes a respective LLM (separate from or the same as the LLM 240) to perform the functionality described with respect to the semantic search. For example, the factual assessment engine 320 submits a request for data from the data sources 260 that is near, in semantic vector space, to data from a user profile accessible from data sources 260.

In one embodiment, the framework evaluator 220 and/or related components perform a search (for example, a semantic search) for a data set against one or more databases of the data sources 260. In one example, the data sources 260 correspond to data repositories containing any suitable data, such as data managed by a third party (such that the third party is different from or unconnected to the client device 230, intermediate LM layer 210, and/or the LLM 240). The data in data sources 260 can be arranged in a tabular format, graph, vector, list, index, catalog, or key-value pair, or any other suitable format. In one embodiment, the data set corresponds to data accessible via an API or within a video game, for example, based on the user's data within the video game. In one example, a software interface, such as an API, generally provides the user and a language model, such as the LLM 240 or the user device 230, access to a corresponding software application, including the data set and functionality of the corresponding software application. In one embodiment, the software application includes external data associated with an external data source.

Embodiments of the framework evaluator 220 perform a search to find related data sets within a semantic vector space to the user query or the task, for example, through the use of word embedding and vector representations of the task and query. In some embodiments, proximity of the task to another data set is indicative of a level of relatedness. In some embodiments, the data set contains one or more words, phrases, or data structures having metadata or characters that are semantically similar to and near in the vector space to the task. For example, each word in a corpus (collection of text) is represented as a high-dimensional vector in a semantic vector space. These vectors can be created using techniques like Word2Vec, GloVe, Bidirectional Encoder Representations from Transformers (BERT), or any suitable technique. In one embodiment, documents such as articles associated with an aspect of the user prompt, web pages associated with an aspect of the user prompt, or databases associated with an aspect of the user prompt are also transformed into vectors by aggregating or averaging the word embeddings of the words within them, generating a vector representation of the document's semantic meaning. To find related results, embodiments of the semantic search engine 222 calculate the semantic similarity between the vector representation of the user query and the vector representations of data sets (for example, video game data or user profile data) contained in data sources 260. Example similarity measures include cosine similarity or Euclidean distance. In some embodiments, the framework evaluator 220 utilizes a relevance threshold to filter out data sets that are not sufficiently similar to the task or user query, ensuring that those data sets that satisfy the relevance threshold are surfaced as candidate data sets. Certain embodiments of the semantic search engine 224 incorporate user feedback to improve results over time. For example, if prior user queries have been serviced by leveraging certain data sources 260 at a high frequency, the system 300 learns to give those types of data sets higher relevance in future searches.

Continuing with the framework evaluator 220, the enriched user query generator 226 is generally responsible for generating an enriched user query and communicating the enriched user query to the LLM 240. Certain embodiments of enriched user query generator 226 employ prompt generation logic to generate an enriched user query (for example, as an updated prompt) that includes the user prompt received from user query interpreter 212 and the prompt-enriching information determined or generated by framework evaluator 220. In one embodiment, the enriched user query generator 226 generates the enriched user query that includes any of the data accessed, determined, or generated by components of system 200. For example, the enriched user query generator 226 generates a prompt based on the user query (for example, user prompt received from user device 230) and the prompt-enriching information generated by framework evaluator 220 (and the components of the framework evaluator 220 discussed with respect to FIG. 3), and the like.

Embodiments of the enriched user query generator 226 combine the prompt-enriching information and the user prompt to generate an enriched user query. In some embodiments, combining the prompt-enriching information and the user prompt includes appending the prompt-enriching information to the user prompt. For example, combining the prompt-enriching information and the user prompt includes adding the prompt-enriching information to the end of the user prompt. In some embodiments, the enriched user query is communicated to the LLM 240 as a single user prompt.

In one embodiment, the enriched user query generator 226 generates a first indication corresponding to the portion of the enriched user query that includes the user query and a second indication corresponding to the portion of the enriched user query that includes the prompt-enriching information. The enriched user query generator 226 can assign different weights to the first indication and the second indication so that the LLM 240 produces an LLM response 270 consistent with those weights. For example, the prompt-enriching information has weight values that are higher than weight values of the user prompt. As another example, the prompt-enriching information corresponds to a plurality of prompt-enriching tokens having weight values that are higher than weight values of a plurality of user tokens corresponding to the user prompt. In this manner, the LLM assigns more weight to tokens associated with the prompt-enriching information than prompt tokens associated with the user query, thereby being better able to mitigate results of hallucination based on a user's deliberate attempt to cause a hallucination with the user query.

In an embodiment, the enriched user query generated by enriched user query generator 226 includes a prompt command directing the LLM 240 to generate computer instructions for instructing an endpoint to update data, such as historical data, based on the LLM output. For example, the computer instructions from the LLM 240 comprise an API call 250 or parameters for generating an API call 250 to update data contained in data sources 260. In some instances, the computer instructions from the LLM 240 specify which specific data to access from the data source(s) 260, new data to be generated based on the data source(s) 260, and/or how the data should be processed in accordance with the user query. In one embodiment, the instructions comprise parameters for an API call 250 referencing an endpoint (for example, data sources 260) associated with a video game application.

In some embodiments, the LLM response 270 from LLM 240 is transmitted directly from the LLM 240 to the user device 230. For example, the LLM response 270 is generated by the LLM 240 based on the user query and the prompt-enriching information. A detailed discussion of the LLM 240 generating an LLM response 270 is discussed with respect to FIG. 4.

The API call generator 228 is generally responsible for updating data sources 260 based on the LLM response 270 so that the data used by the framework evaluator 220 to generate the prompt-enriching information is current and up-to-date. In one embodiment, the API call generator 228 generates an API call 250 associated with computer instructions received from the LLM 240 and that is used to update data sources 260. In some embodiments, the API call generator 228 utilizes API logic to execute an API call 250 associated with an endpoint based on computer instructions from the LLM 240. In some embodiments, the API call generator 228 generates an API call 250 against an API to retrieve data from data sources 260, including websites or external services. For example, the API call generator 228 sends requests to specific API endpoints associated with an API included in the computer instructions from the LLM 240 to retrieve information in a structured format (for example, JavaScript Object Notation [JSON] or Extensible Markup Language [XML]) that would be responsive to the initial request. In this example, the API call 250 generated by the API call generator 228 causes the intermediate LM layer 210 or the LLM 240 to receive the information in the structured format. In one embodiment, generating the API call 250 includes executing an API call that is received as computer instructions in the output from LLM 240. For example, the received set of computer instructions include instructions for an API call. In another embodiment, the received set of computer instructions are used by a component of the intermediate LM layer 210 (for example, the API call generator 228) to generate an API call.

In some embodiments, an aspect of the user query is provided as input to the LLM 240. In response, computer instructions, such as an API call 250 or API parameters for generating an API call, are received from the LLM 240. In some embodiments, the enriched user query and LLM response 270 comprises multiple prompts and responses in a back-and-forth manner. In an embodiment, the computer instructions are received by the intermediate LM layer 210 or received at the client layer. For example, where the instructions comprise an instantiated API call, the API call 250 is received and executed by a computing application operating at the client layer. In some embodiments, the instructions comprise parameters (for example, API parameters) for generating an API call 250. For example, a computing service, such as the API call generator 228, operating in the intermediate LM layer generates an API call 250 based on the API parameters. In one embodiment, the generated API call 250 is executed by a computing application operating at the client layer. Accordingly, embodiments of the computing application access and process at least a portion of the data, from the data set(s), according to the instructions of the API call 250.

Although certain embodiments are discussed in the context of an API call 250 being made to update data sources, it should be understood that in some embodiments, the data sources are updated without invoking an API call. For example, the API call generator 228 performs a semantic search for data sources containing data relevant to the LLM response 270 and updates those sources based on the LLM response 270. For example, suppose the LLM response 270 indicates that the user is lying about having completed level 5. In this example, the API call generator 228, with or without generating an API call, updates a database comprising data for a plurality of users or a database containing historical data to indicate that the user lied on a particular time and date regarding their progress through the video game campaign. In this manner, future operations performed by framework evaluator 220 will be based on the most recent data, which in this example, includes the indication that the user lied on a particular time and date regarding their progress through the video game campaign.

In some embodiments, various components of system 200 communicate with the LLM 240 or the intermediate LM layer 210 via one or more applications or services on a user device, across multiple user devices, or in the cloud, to coordinate generating an LLM response 270 based on the enriched user query and updating data sources based on the LLM response 270. In one embodiment, LLM 240 or the intermediate LM layer 210 manages the LLM response 270 across multiple user devices, such as a gaming device, mobile device, laptop device, virtual-reality (VR) headset, and so forth.

FIG. 3 is a block diagram of an example system 300 for determining credibility of a user prompt and prompt-enriching information from a user query to generate an enriched user query, in accordance with an embodiment of the present disclosure. Embodiments of FIG. 2 receive, via user query interpreter 212, a user query; determine, via framework evaluator 220, prompt-enriching information; generate, via enriched user query generator 226, an enriched user query comprising aspects of the user query and prompt-enriching information; cause the enriched user query to be processed by LLM 240 (as discussed with respect to FIG. 4); and thereafter produce an LLM response 270 that is communicated to the user and/or used to update data sources 260 of FIG. 2. Similar to the system 200 of FIG. 2, the system 300 includes user query interpreter 212, framework evaluator 220, enriched user query generator 226, LLM 240, and LLM response 270. As illustrated, system 300 includes additional components for framework evaluator 220, such as logical reasoning engine 310, factual assessment engine 320, evidence and observation engine 330, critical thinking engine 340, and experiential historical trends engine 350.

The illustrated logical reasoning engine 310 performs a logical assessment of the user prompt. In some embodiments, the logical reasoning engine 310 analyzes a user query, including a legal question asked to a witness. For example, the logical reasoning engine 310 determines credibility problems, logical errors, or inconsistencies based on the federal rules of evidence. In one embodiment, the logical reasoning engine 310 deduces conclusions from premises. For example, if the premises are true and the reasoning logical, the conclusions are likely to be true. Example logical assessments performed by logical reasoning engine 310 include determining a level of inductive reasoning, deductive reasoning, or abductive reasoning.

In general, inductive reasoning refers to the notion whereby specific observations lead to a general rule. For example, under inductive reasoning, certain premises serve as evidence for a conclusion or truth. In some embodiments, logical reasoning engine 310 performs inductive reasoning based on a probability of observation. For example, logical reasoning engine 310 employs a neural network to classify or make a prediction about certain premises. For example, suppose a user query indicates a premise "after I acquired the X trophy in the Sudanium map." In this example, the logical reasoning engine 310 performs a query against the user profile for trophies obtained and identifies the trophies acquired in the Sudanium map. In this example, if trophy X is not among those trophies, the logical reasoning engine 310 determines that the user query is not logically sound. In this example, the logical reasoning engine 310 generates an indication that the user query lacks logical reasoning. In some embodiments, the indication is binary, while in other embodiments, the indication includes a level, percentage, or ratio, or other designation of reasoning that is consumed by the enriched user query generator.

In general, deductive reasoning or "top-down" logic refers to factual statements that are combined or used to arrive at a logical conclusion. For example, if all the premises (for example, factual statements in the user prompt) are true, and deductive logic is followed to arrive at a conclusion, then the conclusion is also generally true. In some embodiments, the logical reasoning engine 310 employs deductive reasoning by accessing information generated by the user query interpreter 212 of FIG. 2 or the factual assessment engine 320 and performing a semantic analysis of the combination of certain information generated by user query interpreter 212 and the factual assessment engine 320 (or any other component of system 300). Suppose that a user query indicates that "in the video game it is raining outside, and my player is outside." In this example, logical reasoning engine 310 could employ deductive reasoning to access this user query from the user query interpreter 212 to indicate that, based on both of these statements, the "player is getting wet."

In general, abductive reasoning refers to a logic whereby if a larger premise is prevalent or true, then a more minor premise is probable. For example, defining a conclusion would also make the conclusion probable. In some embodiments, the logical reasoning engine 310 employs deductive reasoning by receiving an indication of a factual assessment of an aspect of the user query and based on the factual assessment determining the most likely explanation for the indication of the factual assessment. An example of abductive reasoning to arrive at a conclusion is a decision made by a jury, whereby a group of people arrive at a conclusion based on available evidence and witness testimonies. In this example, the jury forms a conclusion based on this possibly incomplete information.

The illustrated factual assessment engine 320 generally performs a factual assessment of the user query. In some embodiments, the factual assessment engine 320 performs the factual assessment by comparing aspects of the user query from the user query interpreter 212 to certain data sources 260. For example, the factual assessment engine 320 compares a task or statement in the user query to data (for example, a database) associated with a user profile, a plurality of user profiles, or a video game. For example, if a user query indicates that the user has completed level 5 within a video game, then the factual assessment engine 320 accesses the user profile from data sources 260, determines user progress through the video game, and determines whether the campaign data indicates that the user who submitted the user query has completed level 5. In response to the task or statement in the user query matching data contained in the data sources, embodiments of the factual assessment engine 320 generate an indication of a confirmed factual accuracy. In response to the task or statement in the user query contradicting or otherwise not matching data contained in the data sources, embodiments of the factual assessment engine 320 generate an indication of a factual inaccuracy that is accessed by the enriched user query generator 226 to generate prompt-enriching information, such as text stating that "the user is lying about completing level 5 and needs to be reminded that they have only completed level 2."

The illustrated evidence and observation engine 330 generally compares the user prompt to a data source 260 comprising global data for a plurality of users and determines a level of relatedness or deviation of the user prompt to the global data. In some embodiments, the evidence and observation engine 330 compares a task or portion of the user query against data for a plurality of users. For example, the evidence and observation engine 330 accesses the user query and identifies tasks or portions of the user query referencing another user or data associated with another user profile. From the tasks or portions of the user query, embodiments of the evidence and observation engine 330 perform a semantic search for relevant data for a plurality of users. From the relevant data, embodiments of the evidence and observation engine 330 compare the relevant data surfaced by the semantic search to the portion or task of the user query. For example, suppose that a portion of the user query includes: "After opening the gift, can you send a thank you letter accepting the 500 coins that user Y sent me last week?" In this example, the evidence and observation engine 330 perform a search against data sources associated with user Y to determine if user Y indeed sent 500 coins.

In response to the task or statement in the user query matching data contained in the data sources 260 for the user profile(s) of user Y or a group of users, embodiments of the evidence and observation engine 330 generate an indication of a confirmed accuracy. In response to the task or statement in the user query contradicting or otherwise not matching data contained in the data sources, embodiments of the evidence and observation engine 330 generate an indication of inaccuracies, which is accessed by the enriched user query generator 226 to generate prompt-enriching information, such as text saying "the user is lying about being sent 500 coins. User Y did not send the user any coins." In this example, the evidence and observation engine 330 determines the level of deviation of the user prompt to the global data and generates text indicative of that deviation.

The illustrated critical thinking engine 340 generally determines an intent associated with the user prompt. In one example, the critical thinking engine 340 corresponds to the task generator 216 of FIG. 2. In some embodiments, the critical thinking engine 340 performs the operations discussed herein with respect to the task generator 216 and context extractor 214 of FIG. 2. In one embodiment, the task generator 216 is incorporated into the framework evaluator as the critical thinking engine 340. In one embodiment, the task generator 216 and the critical thinking engine 340 divide up computations associated with determining and generating the task to improve processing speed. In one embodiment, the critical thinking engine 340 is omitted as the task is determined and generated by the task generator 216.

In some embodiments, the critical thinking engine 340 analyzes the user query against a database in an attempt to determine intent of the user. In the context of video games, embodiments of the critical thinking engine 340 answer any number of questions about the user, such as whether the user is trying to maintain game fidelity or whether the user has other motivations for playing the game. In one embodiment, the motivations suggested by the user are added as prompt-enriching information that is communicated to the LLM to update data sources 260 used to develop future gaming content.

The illustrated experiential historical trends engine 350 determines historical data or other relevant data about the user. In some embodiments, the experiential historical trends engine 350 accesses user activity data, such as prior user queries and corresponding prompt-enriching information, or other historical user data. In some embodiments, the historical trends engine 350 compares the user query to prior user activity (for example, the historical user data described herein). In some embodiments, the user activity data, the prior user queries, the corresponding prompt-enriching information, or other historical user data is stored on and accessible via data sources 260, which can include data sources 104*a* and 104*b* through 104*n* of FIG. 1. In some embodiments, the experiential historical trends engine 350 accumulates data of a particular user or group (or in some cases, a plurality of users including crowdsourced data) for use by any component of system 200 or system 300.

Historical user data, in one example, comprises any information that is related to a person and that person's interactions during a video game, as well as information related to the video game and related prior user prompts. Historical user data may be received from a variety of sources and available in a variety of formats. By way of example and without limitation, historical user data comprises at least one of: audio information (for example, an audio file having a recording of sound and spoken content from the video game); transcript information (for example, a document having text that has been extracted out of the video game based on audio from gameplay within the video game); contact information (for example, email, instant message icon, gamer tag, or other gaming identifier, and so forth associated with gamers or video game players, and can also specify a person's communication preferences); location information (for example, a person's current location or location of where the gaming device is located); presence; user-related activity, which may comprise activity relevant to a user or group member, such as social media or online activity, such as a post to a social media platform or website, subscription information, information regarding topics of interest to a user, or other historical user data that may be determined via a user device (such as user device 102*a* of FIG. 1); task-related information (for example, an outstanding task or gaming mission assigned to the user as part of the campaign of the video game); information about a group or group member that they may choose to share (for example, birthday, anniversary, etc.); or information in common with the user (for example, common groups, backgrounds, education, interests, or hobbies). Additional examples of historical user data are possible.

By way of example and not limitation, historical user data determined by experiential historical trends engine 350 includes data that is sensed, detected, or determined from one or more sensors (referred to in one example as sensor data or historical user data), such as location information of gaming, mobile, or other computing device(s), properties or characteristics of the user device(s), user-activity information (for example: video gameplay; app usage; online activity; searches; voice data such as automatic speech recognition; activity logs; communications data, including calls, texts, chats, messages, and emails; document comments or website posts; other historical user data associated with events during which a user prompt was utilized (including user history, session logs, application data, contacts data, calendar and schedule data, notification data, social-network data, e-commerce activity, user-account(s) data [which may include data from user preferences or settings associated with a personalization-related application, a personal assistant application or service, an online service or cloud-based video game, an entertainment or streaming media account, or a purchasing club or services]); global positioning system (GPS) data; other user device data (which may include device settings, profiles, network-related information, payment or credit card usage data, or purchase history data);

other sensor data that is sensed or otherwise detected by a sensor (or other detector) component(s), including data derived from a sensor component associated with the user (including location, motion, orientation, position, user access, user activity, network-access, user-device charging, or other data that is capable of being provided by one or more sensor components); and data derived based on other data (for example, location data that can be derived from Wi-Fi, cellular network, or internet protocol [IP] address data), and nearly any other source of data that is sensed, detected, or determined as described herein.

To help illustrate with a non-limiting example, suppose a legal professional, such as a lawyer, poses questions to elicit favorable responses from a person being asked the questions (also referred to as a "witness" or "deponent"). In this example, the lawyer's questions generally should comply with the federal and/or state rules of evidence. Typically, certain questions may be objected to by an opposing attorney according to the rules of evidence. In addition, trial courts may, in their discretion, allow a witness to give testimony in narrative form. Where testimony is given in narrative form, lawyers make objections to irrelevant or inadmissible statements as they appear in the course of the narrative. To facilitate enforcement of the rules of evidence, the example system 200 of FIG. 2 or example system 300 may access the questions asked by the lawyer to determine admissibility.

Continuing this example, objections may be made to the form of a question or the substance of the question. Example objections to the form include objections to a question that is compound, vague and ambiguous, argumentative, leading, calls for a narrative, misstates testimony, or repetitive.

Example objections to the substance of the question include foundation, assumes facts not in evidence, hearsay, relevance, speculation, or improper opinion or legal conclusion. In one example, "assumes facts not in evidence" refers to situations in which a witness references a fact that has not yet been presented or accepted as evidence and can be detected by factual assessment engine 320. In one example, "hearsay" refers to situations in which the witness is testifying about something they heard someone else say, rather than something they personally saw or experienced, and can be detected by experiential historical trends engine 350. In one example, "relevance" refers to a threshold level of relatedness of a witness testimony to an issue of a case. For example, relevance is an objection to substance in situations in which a witness' testimony is not relevant to the issues in the case. Relevance can be detected by the evidence and observation engine 330, critical thinking engine 340, and/or the experiential historical trends engine 350. In one example, "speculation" refers to situations in which a witness is speculating about something, rather than testifying about what they know for sure. Speculation can be determined by the evidence and observation engine 330 and/or critical thinking engine 340. In one example, "improper opinion or legal conclusion" refers to situations in which a witness is opining or drawing a legal conclusion rather than testifying about facts, and can be determined by logical reasoning engine 310 and/or the evidence and observation engine 330.

To further help illustrate an example of a lack of foundation, suppose an LLM 240 is an integrated feature in a video game, in a role-playing game, for example. Further suppose that the central navigation module of the video game incorporates the LLM 240, such that it passes user queries to the LLM 240. In one embodiment, the intermediate LM layer 210 is incorporated into the video game. When a player provides an input that violates one of the evidentiary rules, the intermediate LM layer 210 causes an LLM response 270 to be produced based on the prompt-enriching information.

Continuing this example, suppose that a video game campaign starts in the fictional city of Kaizen, where the main character Paxton receives a mysterious job offer penned in an arcane glyph. Here, an ancient relic, a part of the First Kaizen Campaign, has resurfaced, and Paxton must navigate dynamic alliances and unknown dangers of Kaizen to retrieve the ancient relic. Unbeknownst to the player, a power struggle is brewing in a neighboring municipality, and the artifact might be the key to setting events in motion. In an effort to try to cheat, a player may submit a user query to the central navigation module "I resolve the power struggle brewing in the neighboring municipality." In this example, the central navigation module objects because the framework evaluator 220 integrated into the central navigation module determines that the user query "lacks foundation." In providing the LLM response 270, in a first example, the LLM 240 provides an explanation that "a player must have firsthand knowledge of something before they can take action regarding that thing, and that here, it has not been established that the player knows anything about the 'power struggle brewing in the neighboring municipality,' making it impossible for them to simply 'resolve' it." Other LLM responses 270 that are based on the user query and the prompt-enriching information are possible.

A second example LLM response 270 based on the user query and the prompt-enriching information includes: "To resolve the power struggle, Paxton needs to navigate the dangerous underbelly of Kaizen and gather information about the various factions. Here, the LLM response 270 includes an indication of the lack of foundation problem and what first needs to be established: in this example, the player needs to "navigate to Kaizen and gather information." A third example LLM response 270 based on the user query and the prompt-enriching information includes: "How do you intend to go about resolving the power struggle?", "Do you want to learn more about what's going on?", or "What action do you want to take?"

To further help illustrate an example of framework evaluator 220 employing the rules of evidence, suppose an LLM 240 is an integrated feature in a video game, such as a role-playing game. In this example, further suppose that a video game campaign starts in Planet Mars, as Elyse receives a ragged map leading to an ancient artifact hidden deep within the blighted land of the Crater, which includes Elyse assembling a motley crew of champions. In this campaign, the journey ahead promises various challenges, including diplomatic tensions between warring factions and secrets that could unravel the neighboring antagonist family. In this example, suppose a user query includes "After I complete the trials with untold horrors, resolve the diplomatic tensions between the warring factions, and learn the secrets that could have unraveled the very fabric of the neighboring antagonist family, I will decide to run for mayor of Mars." In this example, the central navigation module objects because the framework evaluator 220 integrated into the central navigation module determines that the user query "assumes facts not in evidence."

In providing the LLM response 270, in a first example, the LLM 240 provides an explanation that "a player cannot reference/inject new facts into the narrative that have not yet been introduced. Here, the player has not yet proven their 'loyalty and strength,' and the central navigation module will need to correct the player before the intended action of using skills, stealth, or manipulation to persuade the leaders." A second example LLM response 270 includes a response: "Unfortunately, resolving these problems will not be so easy, and you may have to put your mayoral aspirations on hold for the time being. What do you want to try doing first?" Other LLM responses 270 that are based on the user query and the prompt-enriching information are possible.

As discussed herein, although certain examples are discussed in the context of a video game, it should be understood that the embodiments disclosed herein are applicable in other technical contexts, such as chat bots, translation services, life science research, financial services, writing and debugging software, as well as certain legal services, such as administering the rules of evidence (for example, the Federal Rules of Evidence), among other technical contexts. Indeed, the embodiments discussed herein are applicable in association with any suitable language model or neural network.

Figure 4:
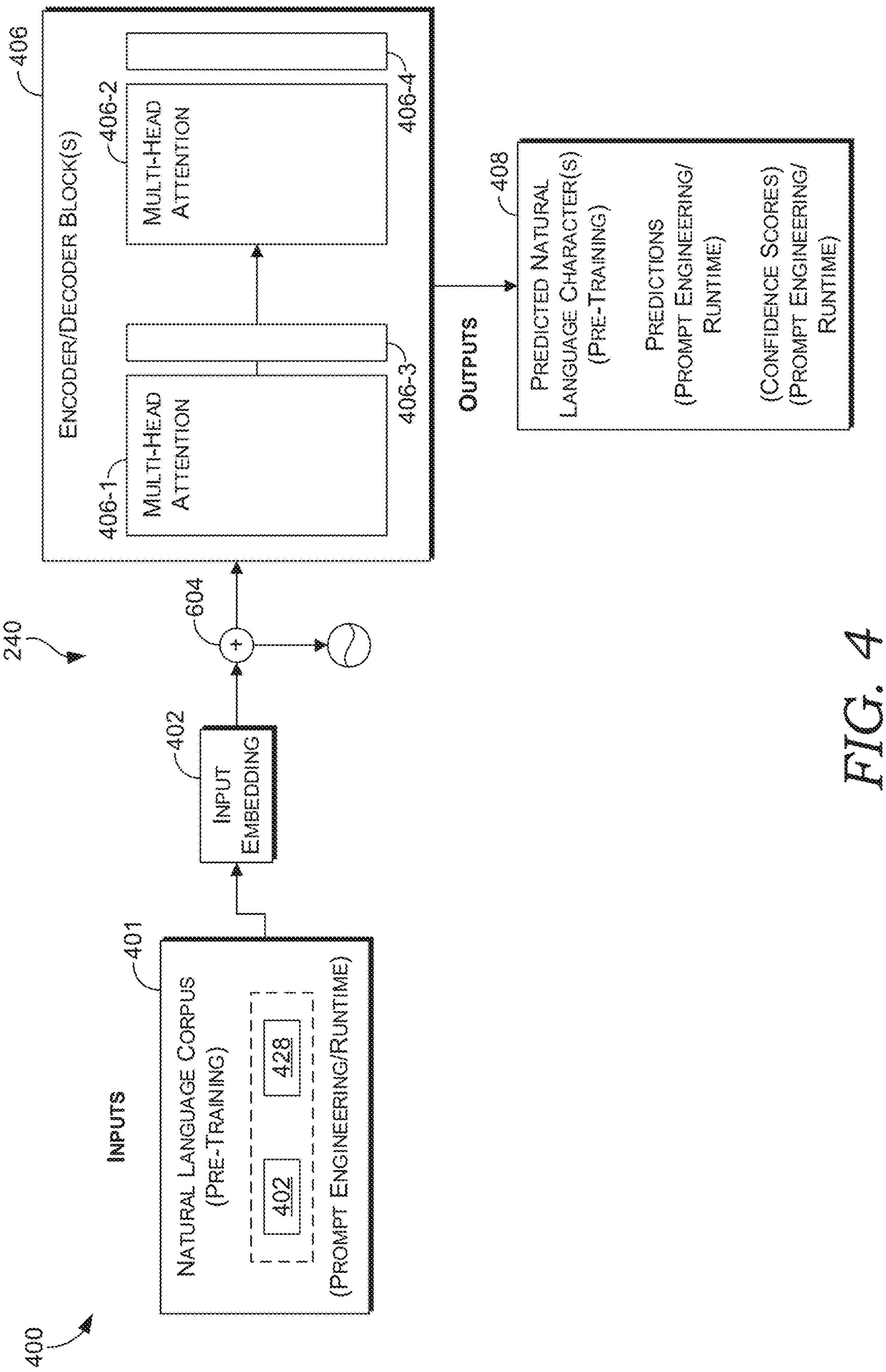
FIG. 4 is a block diagram of a language model that uses particular inputs to make particular predictions, in accordance with an embodiment of the present disclosure.

FIG. 4 is a block diagram of a language model 400 (for example, a BERT model or Generative Pre-Trained Transformer [GPT]-4 model) that uses particular inputs to make particular predictions (for example, answers to questions or generated LLM responses 270 [FIG. 2]), according to some embodiments. In one embodiment, the language model 400 corresponds to the LLM 240 described herein. For example, this model 400 represents or includes the functionality as described with respect to the LLM 240 or the intermediate LM layer 210 of FIG. 2 or 3. In various embodiments, the language model 400 includes one or more encoders and/or decoder blocks 406 (or any transformer or portion thereof).

First, a natural language corpus (for example, various WIKIPEDIA English words or BooksCorpus) of the inputs 401 are converted into tokens, which are then converted into feature vectors and embedded into an input embedding 402 to derive meaning of individual natural language words (for example, English semantics) during pre-training. In some embodiments, to understand English language, corpus documents, such as text books, periodicals, blogs, social media feeds, and the like are ingested by the language model 400.

In some embodiments, each word or character in the input(s) 401 is mapped into the input embedding 402 in parallel or at the same time, unlike existing long short-term memory (LSTM) models, for example. The input embedding 402 maps a word to a feature vector representing the word. But the same word (for example, "bear") in different sentences may have different meanings (for example, the animal versus a verb meaning to tolerate). This is why a positional encoder 404 can be implemented. A positional encoder 404 is a vector that gives context to words (for example, "bear") based on a position of a word in a sentence. For example, with respect to a message "I just sent the document," because "I" is at the beginning of a sentence, embodiments can indicate a position in an embedding closer to "just," as opposed to "document." Some embodiments use a sine/cosine function to generate the positional encoder vector using the following two example equations:

$$PE_{(pos,2i)} = \sin\left(pos/10000^{2i/d_{model}}\right) \tag{1}$$

$$PE_{(pos,2i+1)} = \cos\left(pos/10000^{2i/d_{model}}\right). \tag{2}$$

After passing the input(s) 401 through the input embedding 402 and applying the positional encoder 404, the output is a word embedding feature vector, which encodes positional information or context based on the positional encoder 404. These word embedding feature vectors are then passed to the encoder and/or decoder block(s) 406, where it goes through a multi-head attention layer 406-1 and a feedforward layer 406-2. The multi-head attention layer 406-1 is generally responsible for focusing or processing certain parts of the feature vectors representing specific portions of the input(s) 401 by generating attention vectors. For example, in Question-Answering systems, the multi-head attention layer 406-1 determines how relevant the $i^{th}$ word (or particular word in a sentence) is for answering the question or relevance to other words in the same or other blocks, the output of which is an attention vector. For every word, some embodiments generate an attention vector, which captures contextual relationships between other words in the same sentence or other sequences of characters. For a given word, some embodiments compute a weighted average or otherwise aggregate attention vectors of other words that contain the given word (for example, other words in the same line or block) to compute a final attention vector.

In some embodiments, a single-headed attention has abstract vectors Q, K, and V that extract different components of a particular word. These are used to compute the attention vectors for every word, using the following equation (3):

$$Z = \text{softmax}\left(\frac{Q.K^T}{\sqrt{\text{Dimension of vector } Q, K \text{ or } V}}\right).V. \tag{3}$$

For multi-headed attention, there are multiple weight matrices $W^q$, $W^k$, and $W^V$, so there are multiple attention vectors Z for every word. However, a neural network may expect one attention vector per word. Accordingly, another weighted matrix, $W^z$, is used to make sure the output is still an attention vector per word. In some embodiments, after the layers 406-1 and 406-2, a form of normalization (for example, batch normalization and/or layer normalization) is performed to smoothen out the loss surface, making it easier to optimize while using larger learning rates.

Layers 406-3 and 406-4 represent residual connection and/or normalization layers where normalization recenters and rescales or normalizes the data across the feature dimensions. The illustrated feedforward layer 406-2 is a feedforward neural network that is applied to every one of the attention vectors outputted by the multi-head attention layer 406-1. The feedforward layer 406-2 transforms the attention vectors into a form that can be processed by the next encoder block or make a prediction at 408. For example, given that a document includes a first natural language sequence "the due date is . . . ," the encoder/decoder block(s) 406 predicts that the next natural language sequence will be a specific date or particular words based on past documents that include language identical or similar to the first natural language sequence.

In some embodiments, the encoder/decoder block(s) 406 includes pre-training to learn language (pre-training) and make corresponding inferences, classifications, or predictions. In some embodiments, there is no fine-tuning because some embodiments perform prompt engineering or learning. Pre-training is performed to understand language, and fine-tuning is performed to learn a specific task, such as learning an answer to a set of questions (in Question-Answering [QA] systems).

In some embodiments, the encoder/decoder block(s) 406 learns what language and context for a word is in pre-training by training on two unsupervised tasks (Masked Language Model [MLM] and Next Sentence Prediction [NSP]) simultaneously or at the same time. In terms of the inputs and outputs, at pre-training, the natural language corpus of the inputs 401 may be various historical documents, such as text books, journals, and periodicals, in order to output the predicted natural language characters in 408 (not make the predictions at runtime or prompt engineering at this point). The example encoder/decoder block(s) 406 takes in a sentence, paragraph, or sequence (for example, included in the input[s] 401), with random words being replaced with masks. The goal is to output the value or meaning of the masked tokens. For example, if a line reads, "please [MASK] this document promptly," the prediction for the "mask" value is "send." This helps the encoder/decoder block(s) 406 understand the bidirectional context in a sentence, paragraph, or line in a document. In the case of NSP, the encoder/decoder block(s) 406 takes, as input, two or more elements, such as sentences, lines, or paragraphs, and determines, for example, if a second sentence in a document actually follows (for example, is directly below) a first sentence in the document. This helps the encoder/decoder block(s) 406 understand the context across all the elements of a document, not just within a single element. Using both of these together, the encoder/decoder block(s) 406 derives a good understanding of natural language.

In some embodiments, during pre-training, the input to the encoder/decoder block(s) 406 is a set (for example, two) of masked sentences (sentences for which there are one or more masks), which could alternatively be partial strings or paragraphs. In some embodiments, each word is represented as a token, and some of the tokens are masked. Each token is then converted into a word embedding (for example, 402). At the output side is the binary output for the next sentence prediction. For example, this component outputs 1 if masked sentence 2 follows (for example, is directly beneath) masked sentence 1. In one embodiment, the outputs are word feature vectors that correspond to the outputs for the machine learning model functionality. Thus, the number of word feature vectors that are input is the same number of word feature vectors that are output.

In some embodiments, the initial embedding (for example, the input embedding 402) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence numbers (that includes the input[s] 401) that is encoded into a vector (for example, first sentence, second sentence, and so forth, assuming a top-down and right-to-left approach). The position embeddings are vectors that represent the position of a particular word in such a sentence that can be produced by positional encoder 404. In embodiments where these three embeddings are added or concatenated together, an embedding vector is generated that is used as input into the encoder/decoder block(s) 406. The segment and position embeddings are used for temporal ordering since all of the vectors are fed into the encoder/decoder block(s) 406 simultaneously, and language models need some sort of order preserved.

In pre-training, the output is typically a binary value C (for NSP) and various word vectors (for MLM). With training, a loss (for example, cross-entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, after pre-training is performed, the encoder/decoder block(s) 406 performs prompt engineering or fine-tuning on a variety of QA data sets by converting different QA formats into a unified sequence-to-sequence format. For example, some embodiments perform the QA task by adding a new question-answering head or encoder/decoder block, just the way a masked language model head is added (in pre-training) for performing an MLM task, except that the task is a part of prompt engineering or fine-tuning. This includes the encoder/decoder block(s) 406 processing the inputs 402 and/or 428 (for example, the user query received by user query interpreter 212 of FIGS. 2 and 3, the prompt-enriching information determined by framework evaluator 220 of FIGS. 2 and 3, and/or the enriched user query generated by the enriched user query generator 226) in order to make the predictions and generate a prompt response, as indicated in 404. Prompt engineering, in some embodiments, is the process of crafting and optimizing text prompts for language models to achieve desired outputs. In other words, prompt engineering comprises a process of mapping prompts (for example, a question) to the output (for example, an answer) that it belongs to for training. For example, if a user asks a model to generate a poem about a person fishing on a lake, the expectation is that it will generate a different poem each time. Users may then label the output or answers from best to worst. These labels can correspond to the previous queries that are stored in the data sources 260 of FIG. 2 and are accessible by framework evaluator 220 to determine prompt-enriching information for future prompts. Such labels can be input into a model to make sure the model is giving more human-like or best answers, while trying to minimize the worst answers (for example, via reinforcement learning).

In some embodiments, the inputs 401 additionally or alternatively include other inputs, such as the inputs to the LLM 240 described in FIGS. 2 and 3. In an illustrative example, in some embodiments, the predictions of the output 406 represent an LLM response 270, an API, API parameters, an API call, and the like. For instance, the inferences, predications, or classifications are generative text, such as a generative answer to a question, machine translation text, or other generative text, such as text associated with the API, API parameters, or an API call. Alternative to prompt engineering, certain embodiments of inputs 402 and/or 428 (or the inputs or prompts sent to or received by the LLM 240 described in FIGS. 2 and 3) represent inputs provided to the encoder/decoder block(s) 408 at runtime or after the model 400 has been trained, tested, and deployed. Likewise, in these embodiments, the predictions in the output 408 represent predictions made at runtime or after the model 400 has been trained, tested, and deployed.

Figure 5A:
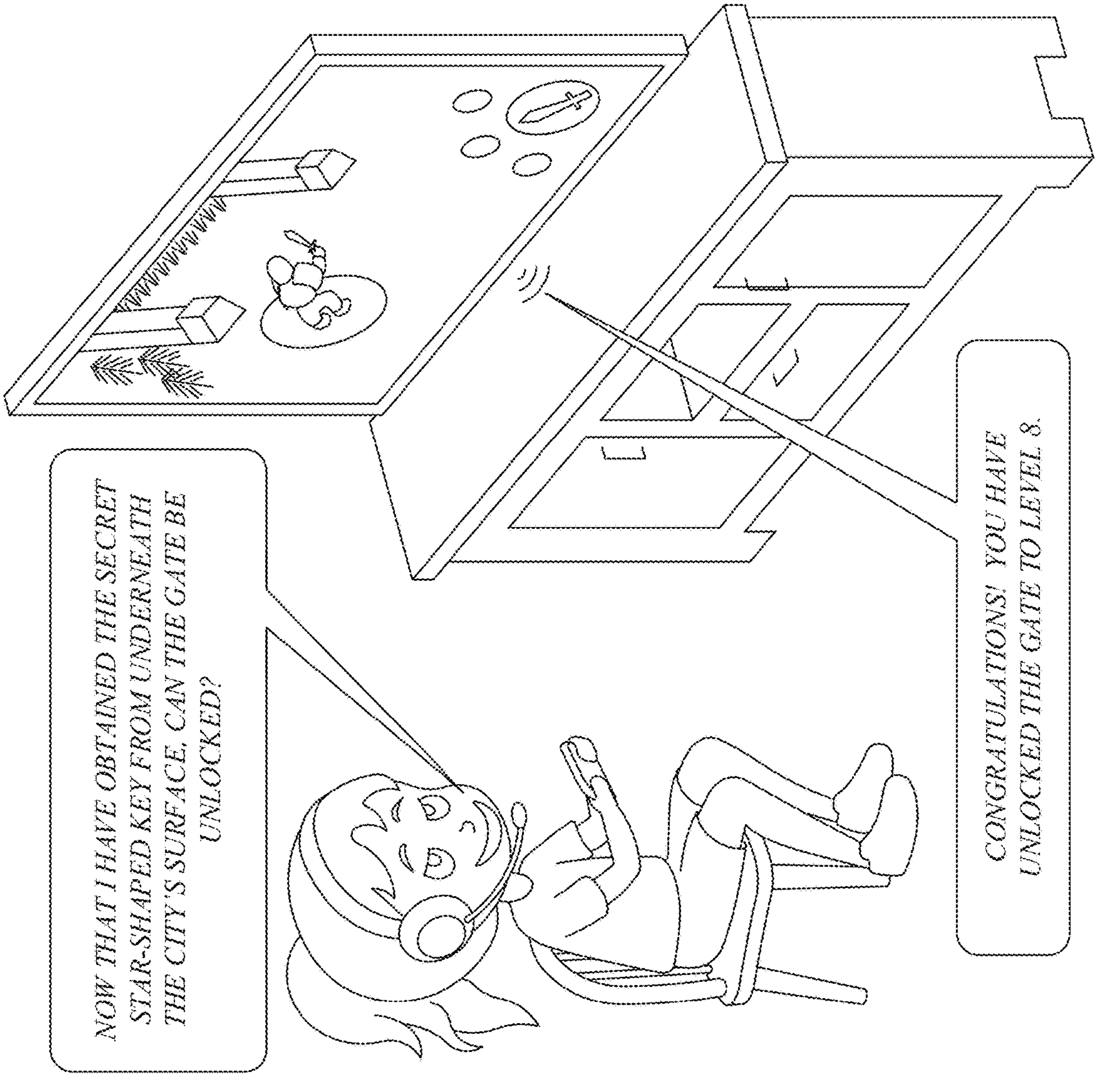
FIG. 5A depicts an example of a conventional user interacting with a video game supporting certain user queries submitted as user prompts to an LLM.

FIG. 5A depicts an example of a conventional user interacting with a video game supporting certain user queries submitted as user prompts to an LLM. By way of a non-limiting example and with reference to the cartoon 500 depicted in FIG. 5A, suppose that a conventional user is a gamer playing a video game. As part of this example video game, the conventional user is tasked with completing various steps of a campaign before proceeding to the next level. In particular, in this example, the conventional user is tasked with resolving the power struggle brewing in the neighboring municipality. Further suppose that the video game supports natural language processing (NLP) query responses, for example, that are communicated to a video game navigator. For example, the conventional user can speak into a microphone (or submit a user query via any suitable device), saying, "What is the next step in this video game campaign?", which is a user prompt that is communicated to an LLM. An LLM output or response to this user prompt is communicated to the conventional user via the video game navigator as the following response: "As part of the next step, you must resolve the power struggle in the neighboring municipality." The conventional user has knowledge from their friend that the power struggle in the neighboring municipality is resolved by obtaining a secret star-shaped key from the village and using the key to unlock a gate. To try to trick the video game navigator, the conventional user submits the following query: "Now that I have obtained the secret star-shaped key from the neighboring municipality, can the gate be unlocked?" In some instances, the video game navigator may pass this user prompt to the LLM, which assumes that because the conventional user knows about the secret key, then the conventional user likely finished the campaign and should proceed to the next campaign behind the gate. In this instance, the video game navigator would divulge information that the conventional user should not yet have access to, or even worse, would allow the conventional user to cheat in the video game by skipping the step in the campaign where the conventional user must resolve the power struggle brewing in the neighboring municipality.

Figure 5B:
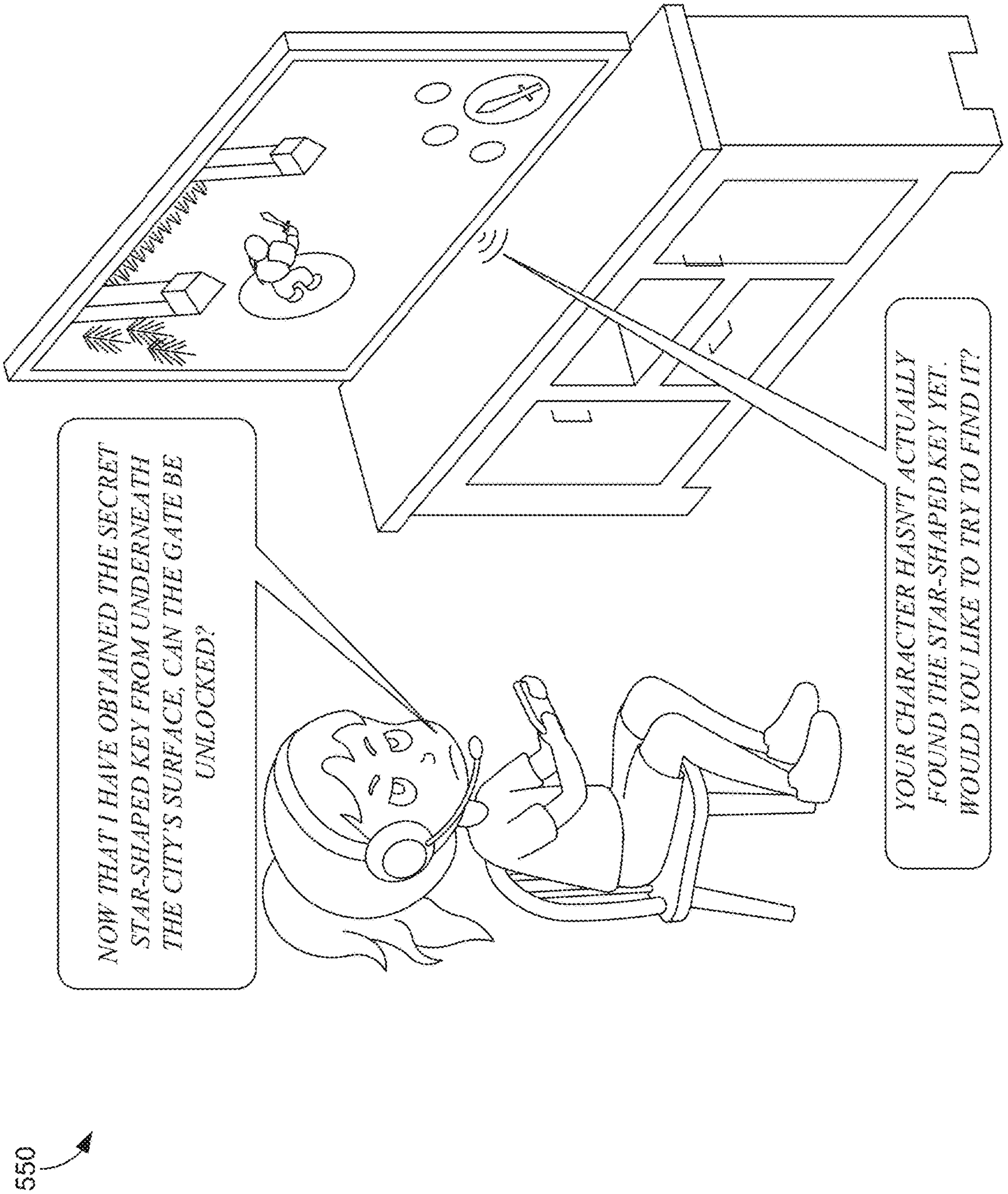
FIG. 5B depicts an example user interacting with a video game supporting an intermediate LM layer that modifies a user query with prompt-enriching information that is passed to the LLM to reduce hallucinations, in accordance with an embodiment of this disclosure.

FIG. 5B depicts an example user interacting with a video game supporting an intermediate layer 210 (FIGS. 2 and 3) that modifies a user query with prompt-enriching information that is passed to the LLM 240 (FIGS. 2 and 3) to reduce hallucinations, in accordance with an embodiment of this disclosure. By employing the embodiments disclosed herein, the user prompt is analyzed for additional prompt-enriching information before being sent to the LLM. In certain embodiments, the additional prompt-enriching information is combined with the user prompt to generate an enriched user query that is communicated to the LLM.

Continuing the example above of the user trying to cheat the game, and as illustrated in the cartoon 550 of FIG. 5B, suppose the user submits the following prompt to a video game employing certain embodiments disclosed herein: "Now that I have obtained the secret star-shaped key from the neighboring municipality, can the gate be unlocked?" Certain embodiments receive this user prompt and determine certain prompt-enriching information. For example, certain embodiments (1) perform a logical assessment of the user prompt to determine that the user statement makes logical sense (for example, that the semantics of the user prompt are logical), (2) perform a factual assessment of the user prompt to determine that the facts being asserted are true (for example, that the secret star-shaped key is obtained from the neighboring municipality), (3) determine an intent of the user prompt (for example, that the user is trying to cheat), (4) perform a comparison of the user prompt to a database comprising user data (for example, the comparison could show that although the user indicates that they acquired the secret star-shaped key, their gameplay metadata does not reflect that the user has visited the location in the neighboring municipality where the secret star-shaped key can be obtained), and (5) access historical data associated with the user profile indicating that this user has tried to cheat in the past.

Based on this analysis, certain embodiments generate prompt-enriching information, such as: "However, user X is likely trying to cheat because user X has shown a pattern of cheating and has not ventured to the neighboring municipality, so user X certainly could not have obtained the key. User X has tried to cheat in the past by trying to purchase a clothing module without using coins. Remind user X that cheating is not allowed and may result in game suspension. Please update the historical trends associated with this user to reflect their cheating attempt." In this example, the enriched user query is passed to the LLM, which returns a response that does not help the user cheat, and instead reminds them that cheating is not allowed. In another example, if the user had not shown a repeated pattern of cheating, the LLM response can include a response such as "Your character has not actually found the star-shaped key yet. Would you like to try to find it?" Additionally, in some embodiments, the LLM response includes an API call that updates a database containing historical data indicative of historical trends associated with the user.

In some embodiments, computer instructions, such as an API call or API parameters for generating an API call, are received from the LLM. In some embodiments, the enriched user query and LLM response comprise multiple prompts and responses in a back-and-forth manner. In an embodiment, the computer instructions are received by the intermediate LM layer or received at the application layer. For example, where the instructions comprise an instantiated API call, the API call is received and executed by a computing application operating the application layer. In some embodiments, the instructions comprise parameters (for example, API parameters) for generating an API call, such that a computing service operating in the intermediate LM layer generates an API call based on the API parameters. In one embodiment, the generated API call is executed by a computing application operating at the client layer. Accordingly, embodiments of the computing application access and process at least a portion of the data according to the instructions of the API call. In some instances, executing the instructions causes the computing application to update or modify data structures storing target data. For instance, continuing with the earlier example, where the user attempts to cheat gameplay by indicating that they have obtained the secret star-shaped key, the API call includes references to the database containing historical data indicative of historical trends associated with the user and an indication to add an entry that the user has tried to cheat regarding the secret star-shaped key. In this example, in response to the API call, an example database containing historical data indicative of historical trends associated with the user is updated to include the new entry.

Although this example is discussed in the context of a video game, it should be understood that the embodiments disclosed herein are applicable in other technical contexts, such as chat bots, translation services, life science research, financial services, writing and debugging software, as well as certain legal services, such as administering the rules of evidence (for example, the Federal Rules of Evidence), among other technical contexts. Indeed, the embodiments discussed herein are applicable in association with any suitable language model or neural network.

Figure 7:
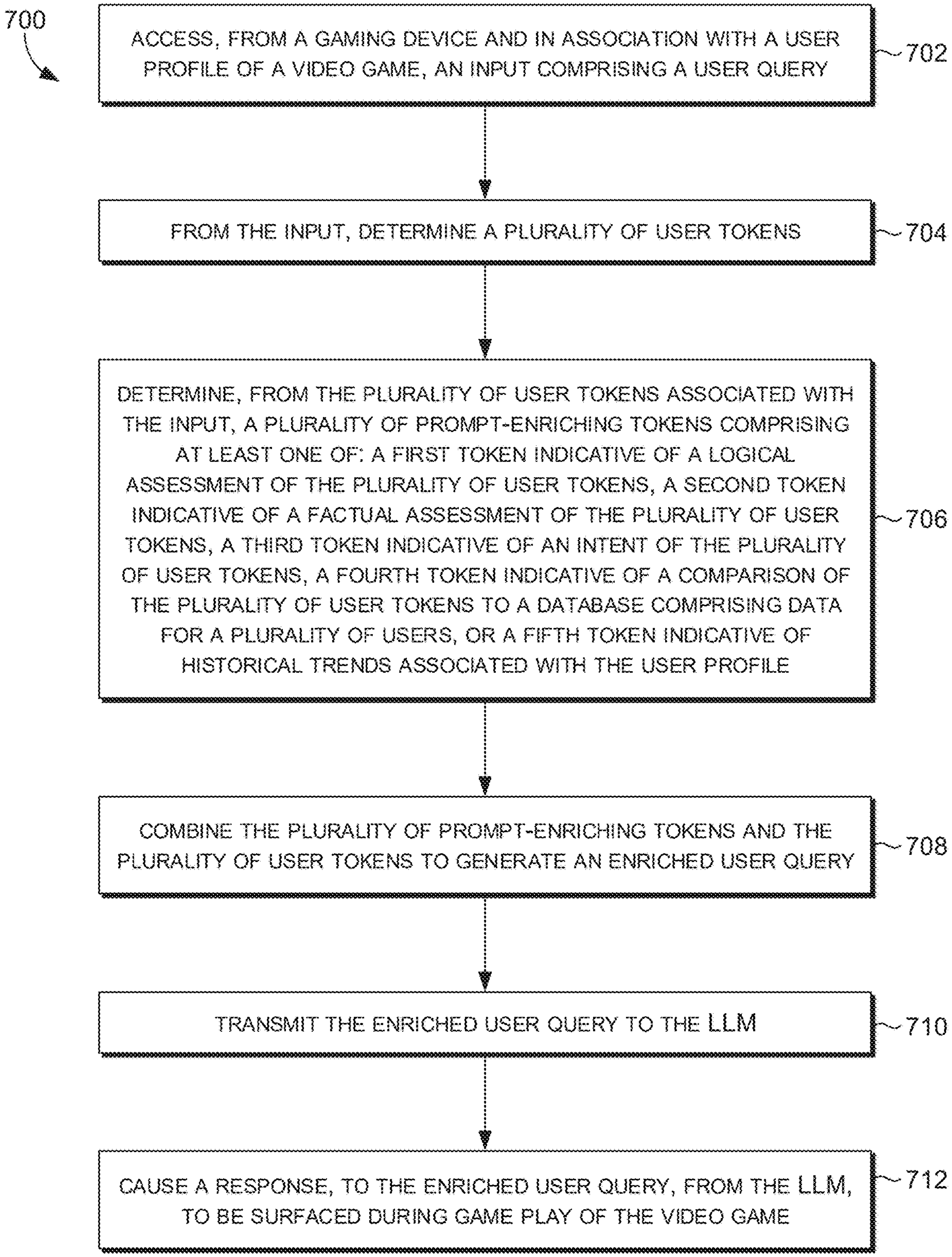
FIG. 7 depicts a flow diagram of a method for programmatically determining prompt-enriching tokens and combining the prompt-enriching tokens with user tokens to generate an enriched user query that is passed to the LLM, in accordance with an embodiment of the present disclosure.

Turning now to FIGS. 6, 7, and 8, aspects of example process flows 600, 700, and 800 are illustratively depicted for some embodiments of the disclosure. Embodiments of process flows 600, 700, and 800 each comprise a method (sometimes referred to herein as method 600, 700, and 800) carried out to implement various example embodiments described herein. For instance, at least one of process flows 600, 700, and 800 is performed to, inter alia, programmatically determine prompt-enriching information, and combine the prompt-enriching information and a user prompt to generate an enriched user query that is passed to the LLM 240 (FIGS. 2 and 3) in lieu of transmitting only the user query to the LLM 240, the subject matter of which is used to provide any of the improved electronic communications technology or enhanced user computing experiences described herein.

Each block or step of process flow 600, process flow 700, process flow 800, and other methods described herein comprises a computing process performed using any combination of hardware, firmware, and/or software. For instance, various functions are carried out by a processor executing instructions stored in memory, such as memory 912, as described in FIG. 9. Embodiments of the methods can also be embodied as computer-usable instructions stored on computer storage media. Embodiments of the methods are provided by a standalone application, a service or hosted service (standalone or in combination with another hosted service), or a plug-in to another product, to name a few. For example, the blocks of process flow 600, 700, and 800 that correspond to actions (or steps) to be performed (as opposed to information to be processed or acted on) are carried out by one or more computing applications or services, in some embodiments, which operate on one or more user devices (such as user devices 102*a* and 102*b* through 102*n* of FIG. 1), and/or are distributed across multiple user devices, and/or servers, or by a distributed computing platform, and/or are implemented in the cloud, such as is described in connection with FIG. 10. In some embodiments, the functions performed by the blocks or steps of process flows 600, 700, and 800 are carried out by components of systems 200 or 300, as described in FIGS. 2 and 3, respectively.

FIG. 6 depicts a flow diagram of a process 600 for programmatically determining prompt-enriching information and combining the prompt-enriching information and a user prompt to generate an enriched user query that is passed to the LLM to generate an LLM response with reduced hallucinations, in accordance with an embodiment of the present disclosure. At block 602, process 600 includes receiving, from a user device and in association with a user profile, an input comprising a user prompt intended for a large language model (LLM). At block 604, process 600 includes determining, from the user prompt, prompt-enriching information comprising at least one of: a first indication of a logical assessment of the user prompt, a second indication of a factual assessment of the user prompt, a third indication of an intent of the user prompt, a fourth indication of a comparison of the user prompt to a database comprising data for a plurality of users, or a fifth indication of historical trends associated with the user profile. At block 606, process 600 includes appending the prompt-enriching information and the user prompt to generate an enriched user query. At block 608, process 600 includes transmitting the enriched user query to the LLM, for example, to cause the LLM to generate an LLM response that is communicated to the user and used to update data sources.

Turning to FIG. 7, depicted is a flow diagram of a method 700 for programmatically determining prompt-enriching tokens and combining the prompt-enriching tokens with user tokens to generate an enriched user query that is passed to the LLM, in accordance with an embodiment of the present disclosure. At block 702, process 700 includes accessing, from a gaming device and in association with a user profile of a video game, an input comprising a user query. At block 704, process 700 includes, from the input, determining a plurality of user tokens. At block 706, process 700 includes determining, from the plurality of user tokens associated with the input, a plurality of prompt-enriching tokens comprising at least one of: a first token indicative of a logical assessment of the plurality of user tokens, a second token indicative of a factual assessment of the plurality of user tokens, a third token indicative of an intent of the plurality of user tokens; a fourth token indicative of a comparison of the plurality of user tokens to a database comprising data for a plurality of users; and a fifth token indicative of historical trends associated with the user profile. At block 708, process 700 includes combining the plurality of prompt-enriching tokens and the plurality of user tokens to generate an enriched user query. At block 710, process 700 includes transmitting the enriched user query to the LLM. At block 712, process 700 includes causing a response, to the enriched user query, from the LLM to be surfaced during gameplay of the video game, for example, to cause the LLM to generate an LLM response that is communicated to the user and used to update data sources.

Figure 9:
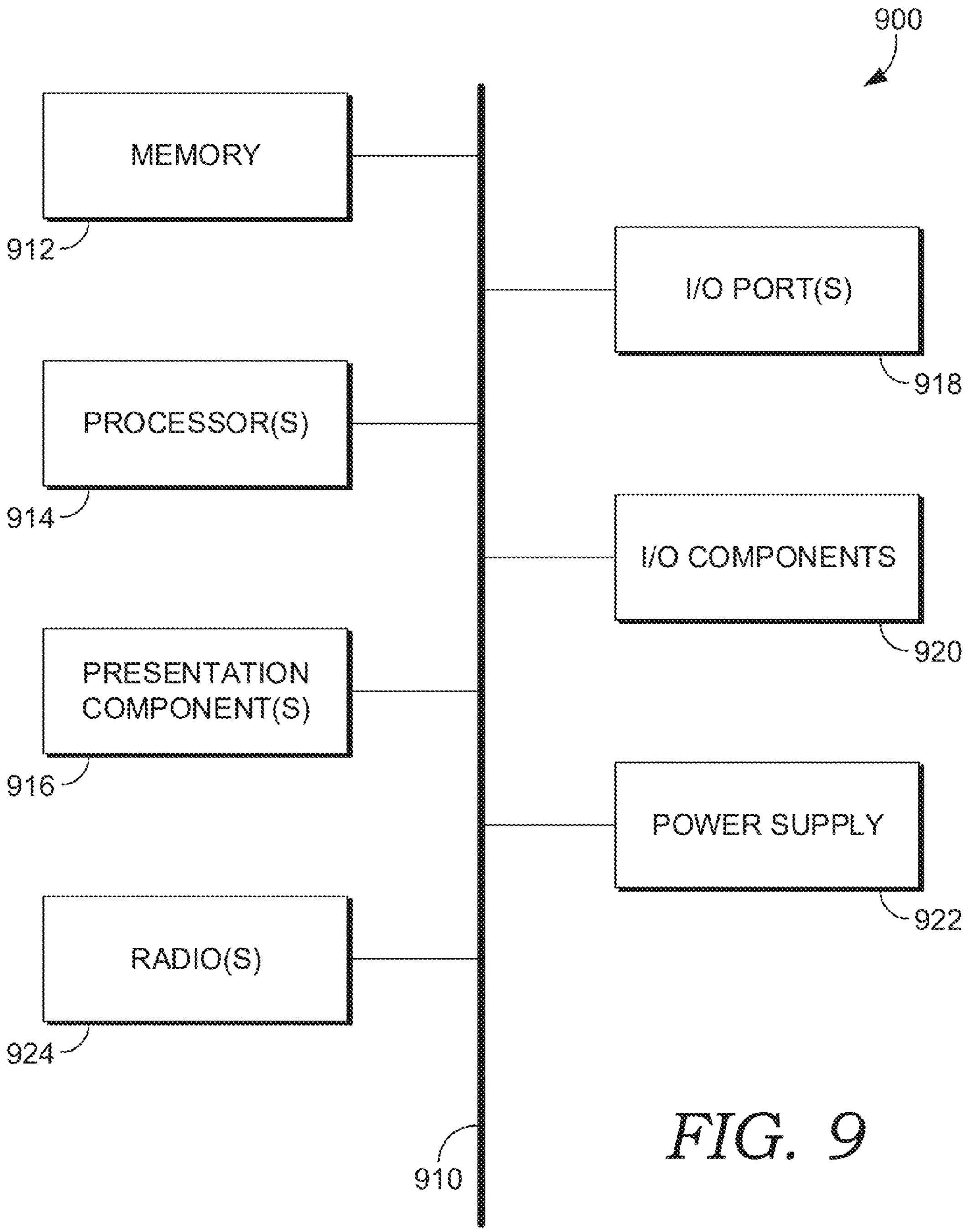
FIG. 9 is a block diagram of an example computing environment suitable for use in implementing an embodiment of the present disclosure.

FIG. 8 depicts a flow diagram of a method 800 for programmatically determining prompt-enriching information and combining the prompt-enriching information and a user prompt to generate an enriched user query that is passed to the LLM to generate an LLM response, in accordance with an embodiment of the present disclosure. At block 802, process 800 includes receiving, in association with a user profile, an input comprising a user query intended for a language model (LM). In lieu of communicating the user query to the LM, at block 804, process 800 includes determining, from the user query, prompt-enriching information comprising at least one of: a first indication of a logical assessment of the user query, a second indication of a factual assessment of the user query, a third indication of an intent of the user query, a fourth indication of a comparison of the user query to a database comprising data for a plurality of users, or a fifth indication of historical trends associated with the user profile. Additionally, at block 806, process 800 includes combining the user query and the prompt-enriching information to generate an enriched user query. At block 808, process 800 includes transmitting the enriched user query to the LM, for example, to cause the LLM to generate an LLM response that is communicated to the user and is used to update data sources. EXAMPLE COMPUTING ENVIRONMENTS Having described various implementations, several example computing environments suitable for implementing embodiments of the disclosure are now described, including an example computing device and an example distributed computing environment in FIGS. 9 and 10, respectively. With reference to FIG. 9, an example computing device is provided and referred to generally as computing device 900. The computing device 900 is but one example of a suitable computing environment and is not intended to suggest any limitation as to the scope of use or functionality of embodiments of the disclosure, and nor should the computing device 900 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. In one example, bus 910 represents one or more buses (such as an address bus, data bus, or combination thereof). Although the various blocks of FIG. 9 are shown with lines for the sake of clarity, in reality, these blocks represent logical, not necessarily actual, components. For example, a presentation component includes a display device, such as an I/O component. Also, processors have memory. This disclosure recognizes that such is the nature of the art and reiterates that the diagram of FIG. 9 is merely illustrative of an example computing device that can be used in connection with one or more embodiments of the present disclosure. Distinction is not made between such categories as “workstation,” “server,” “laptop,” or “hand-held device,” as all are contemplated within the scope of FIG. 9 and with reference to “computing device.”

Computing device 900 typically includes a variety of computer-readable media. Computer-readable media can be any available media that can be accessed by computing device 900 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term “modulated data signal” means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer storage media in the form of volatile and/or non-volatile memory. In one example, the memory is removable, non-removable, or a combination thereof. Hardware devices include, for example, solid-state memory, hard drives, and optical-disc drives. Computing device 900 includes one or more processors 914 that read data from various entities such as memory 912 or I/O components 920. As used herein and in one example, the term processor or “a processer” refers to more than one computer processor. For example, the term processor (or “a processor”) refers to at least one processor, which is a physical or virtual processor, such as a computer processor on a virtual machine. In one example, the term processor (or “a processor”) refers to a plurality of processors, each of which is physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 916 presents data indications to a user or other device. Presentation components include, for example, a display device, speaker, printing component, vibrating component, and the like.

The I/O ports 918 allow computing device 900 to be logically coupled to other devices, including I/O components 920, some of which are built-in. Illustrative components include a microphone, joystick, game pad, satellite dish, scanner, printer, or a wireless device. The I/O components 920 can provide a natural user interface (NUI) that processes air gestures, voice, or other physiological inputs generated by a user. In some instances, inputs are transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 900. In one example, the computing device 900 is equipped with depth cameras, such as stereoscopic camera systems, infrared camera systems, red-green-blue (RGB) camera systems, and combinations of these, for gesture detection and recognition. Additionally, an example computing device 900 is equipped with accelerometers or gyroscopes that enable detection of motion. The output of the accelerometers or gyroscopes may be provided to the display of the computing device 900 to render immersive augmented reality or virtual reality.

Some embodiments of computing device 900 include one or more radio(s) 924 (or similar wireless communication components). The radio transmits and receives radio or wireless communications. Example computing device 900 is a wireless terminal adapted to receive communications and media over various wireless networks. Example computing device 900 communicates via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection.

When this disclosure refers to "short" and "long" types of connections, this disclosure does not mean to refer to the spatial relation between two devices. Instead, this disclosure is generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of CDMA, General Packet Radio Service (GPRS), GSM, TDMA, and 802.16 protocols.

Figure 10:
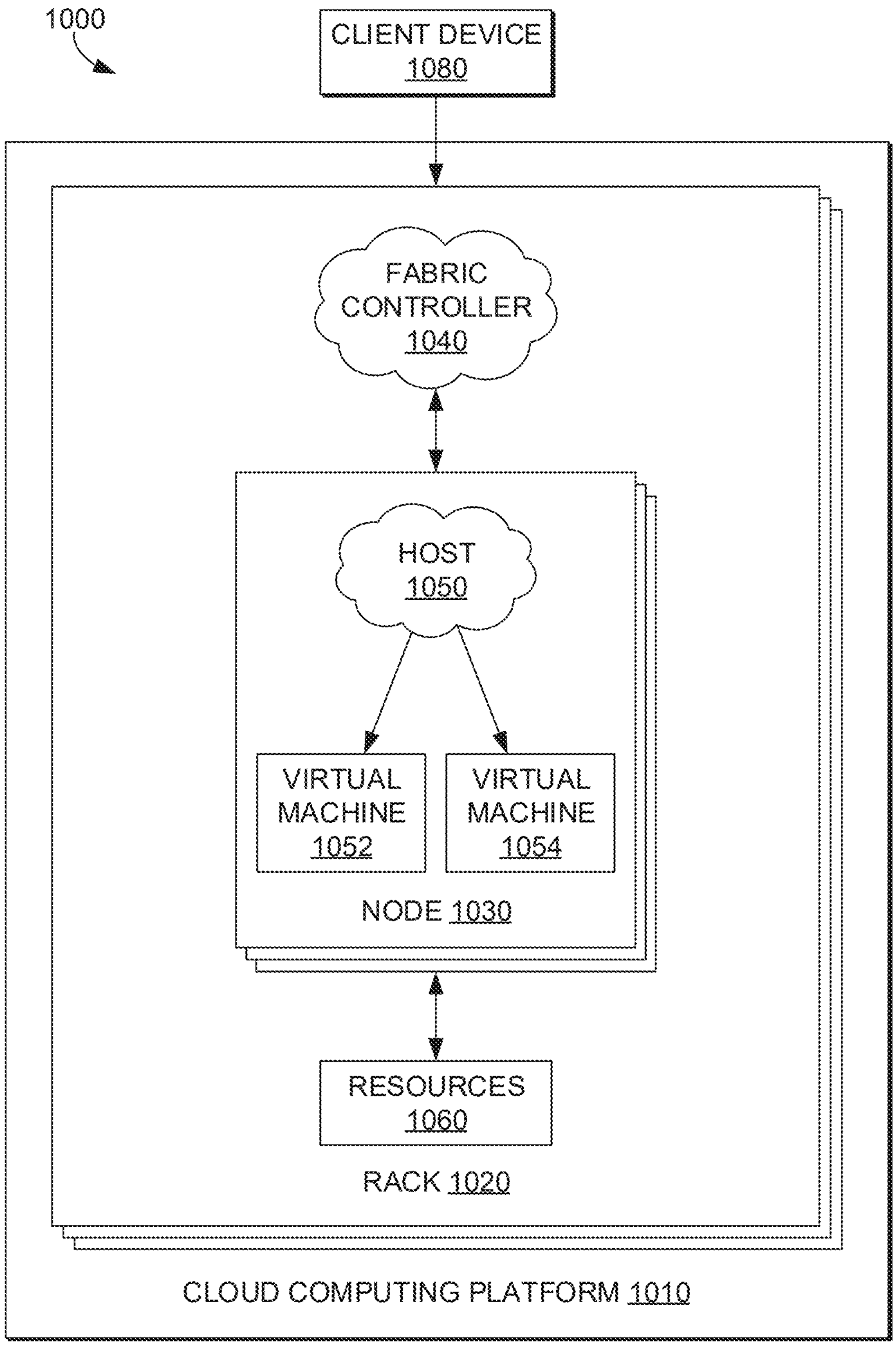
FIG. 10 is a block diagram of an example computing environment suitable for use in implementing an embodiment of the present disclosure.

Referring now to FIG. 10, an example distributed computing environment 1000 is illustratively provided, in which implementations of the present disclosure can be employed. In particular, FIG. 10 shows a high-level architecture of an example cloud computing platform 1010 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1000 that includes cloud computing platform 1010, rack 1020, and node 1030 (for example, computing devices, processing units, or blades) in rack 1020. The technical solution environment can be implemented with cloud computing platform 1010, which runs cloud services across different data centers and geographic regions. Cloud computing platform 1010 can implement the fabric controller 1040 component for provisioning and managing resource allocation, deployment, upgrade, and management of cloud services. Typically, cloud computing platform 1010 acts to store data or run service applications in a distributed manner. Cloud computing platform 1010 in a data center can be configured to host and support operation of endpoints of a particular service application. In one example, the cloud computing platform 1010 is a public cloud, a private cloud, or a dedicated cloud.

Node 1030 can be provisioned with host 1050 (for example, operating system or runtime environment) running a defined software stack on node 1030. Node 1030 can also be configured to perform specialized functionality (for example, computer nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a multitenant infrastructure or tenancy. The terms "service application," "application," or "service" are used interchangeably with regards to FIG. 10, and broadly refer to any software, or portions of software, that run on top of or access storage and computing device locations within a datacenter.

When more than one separate service application is being supported by nodes 1030, certain nodes 1030 are partitioned into virtual machines (for example, virtual machine 1052 and virtual machine 1054). Physical machines can also concurrently run separate service applications. The virtual machines or physical machines can be configured as individualized computing environments that are supported by resources 1060 (for example, hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1080 is linked to a service application in cloud computing platform 1010. Example client device 1080 is any type of computing device, such as user device 102 or 230 described with reference to FIGS. 1 and 2, respectively, and the client device 1080 can be configured to issue commands to cloud computing platform 1010. In embodiments, client device 1080 communicates with service applications through a virtual Internet Protocol (IP) and load balancer or other means that direct communication requests to designated endpoints in cloud computing platform 1010. Certain components of cloud computing platform 1010 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein and in one example, the term "set" is employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . N objects and/or elements, where N is a positive integer with no upper bound. Therefore, as used herein, a set does not include a null set (i.e., an empty set) that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers $\mathbb{N}$). The objects included in other sets may be continuous objects (for example, the set of real numbers $\mathbb{R}$). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset" is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system comprising:

at least one computer processor; and computer storage media storing computer-useable instructions that, when used by the at least one computer processor, cause the system to perform operations comprising:

receiving, from a user device and in association with a user profile engaging in gameplay within a gaming computer environment, an input comprising a user prompt intended for a large language model (LLM);

from the user prompt, during the gameplay, and using an intermediate language model (LM) layer bidirectionally communicatively coupled to the LLM and communicatively coupled to the gaming computer environment, determining prompt-enriching information comprising at least one of: a first indication of a logical assessment of the user prompt, a second indication of a factual assessment of the user prompt, a third indication of an intent of the user prompt, a fourth indication of a comparison of the user prompt to a database comprising data for a plurality of users, or a fifth indication of historical trends associated with the user profile, wherein the intermediate LM layer comprises a framework evaluator that generates an indication of verisimilitude of the user prompt, and the prompt-enriching information comprises the indication of verisimilitude;

appending the prompt-enriching information and the user prompt to generate an enriched user query; and transmitting the enriched user query from the intermediate LM layer to the LLM, wherein transmitting the enriched user query to the LLM causes the LLM to, based on the enriched user query:

generate, during the gameplay, a response to the user prompt, and update a database comprising the historical trends associated with the user profile.

2. The system of claim 1, wherein the operations further comprise:

subsequent to transmitting the enriched user query, receiving, from the LLM, a response to the enriched user query;

based on the response, updating data for the plurality of users, wherein future prompt-enriching information is determined based on the update; and transmitting an aspect of the response to the user device.

3. The system of claim 1, wherein determining the third indication comprises:

extracting, from the input, an action;

determining, from the action, a task; and performing a semantic search with the action and the task, wherein the intent corresponds to a result of the semantic search.

4. The system of claim 1, wherein appending the prompt-enriching information to the user prompt comprises combining the user prompt and the prompt-enriching information into the enriched user query that is transmitted to the LLM as a single user prompt, wherein the prompt-enriching information corresponds to a plurality of prompt-enriching tokens having weight values that are higher than weight values of a plurality of user tokens corresponding to the user prompt.

5. The system of claim 1, wherein the input is received during the gameplay and within a video game associated with the gaming computer environment, wherein a response to the enriched user query from the LLM is communicated within the video game, wherein the operations are performed by the intermediate language model (LM) layer associated with the video game, wherein the input comprising the user prompt is received as part of the gameplay.

6. The system of claim 1, wherein the second indication of the factual assessment comprises an indication that a portion of the user prompt comprises contentions not in evidence.

7. The system of claim 1, wherein the operations further comprise:

receiving, from the LLM, a response to the enriched user query; and communicating, to an endpoint of a video game application and via an Application Programming Interface (API) of the gaming computer environment, an aspect of the response to the enriched user query.

8. The system of claim 1, wherein determining the second indication, the fourth indication, or the fifth indication comprises:

detecting an entity in the user prompt; and based on the detected entity, performing a search operation against the user profile, the database comprising the historical trends associated with the user profile, or the database comprising data for the plurality of users, wherein the search operation is performed against a data set arranged in a tabular format, graph, vector, list, index, catalog, or key-value pair.

9. The system of claim 1, wherein the operations comprise transmitting at least the user prompt from the intermediate LM layer to the LLM to cause the LLM to:

extract a task from the user prompt, wherein the task corresponds to an action to cheat within the gaming computer environment; and perform a search to find a dataset within a semantic vector space to the user prompt or the task, wherein the prompt-enriching information comprises at least a portion of the dataset.

10. The system of claim 9, wherein the task is determined to correspond to an action to cheat based on at least one of:

the logical assessment indicating that the user prompt lacks logical sense;

the factual assessment indicating that the user prompt indicates progress through a campaign that does not match the user profile;

the intent of the user prompt being indicative of a request to cheat;

the comparison of the user prompt to the database indicating that metadata of the user profile does not match the metadata of other user profiles at similar stages in the campaign;

or the historical trends indicating a prior attempt to cheat within the user profile.

11. A computer-implemented method comprising:

accessing, from a gaming device configured to run a video game within a gaming computing environment, an input comprising a user query associated with a user profile;

from the input, determining a plurality of user tokens;

determining, from the plurality of user tokens associated with the input and during gameplay and using an intermediate language model (LM) layer bidirectionally communicatively coupled to a large language model (LLM) and communicatively coupled to the gaming computing environment, a plurality of prompt-enriching tokens comprising at least one of: a first token indicative of a logical assessment of the plurality of user tokens, a second token indicative of a factual assessment of the plurality of user tokens, a third token indicative of an intent of the plurality of user tokens, or a fourth token indicative of a comparison of the plurality of user tokens to a database comprising data for a plurality of users, wherein the intermediate LM layer comprises a framework evaluator that generates an indication of verisimilitude of the user query, and the plurality of prompt-enriching tokens comprises the indication of verisimilitude;

combining the plurality of prompt-enriching tokens and the plurality of user tokens to generate an enriched user query;

transmitting the enriched user query from the intermediate LM layer to the LLM; and based on the enriched user query:

causing a response, from the LLM to be surfaced during gameplay of the video game; and causing a database comprising historical trends associated with the user profile to be updated.

12. The computer-implemented method of claim 11, wherein the input comprising the user query is not communicated directly to the LLM.

13. The computer-implemented method of claim 11, wherein the gaming device comprises at least one of a desktop, a laptop, a VR/AR headset, a mobile device, or a tablet.

14. The computer-implemented method of claim 11, further comprising:

subsequent to transmitting the enriched user query, receiving, from the LLM, a response to the enriched user query;

based on the response, updating data for the plurality of users, wherein future prompt-enriching tokens are determined based on the update; and transmitting an aspect of the response to a user device.

15. The computer-implemented method of claim 11, wherein determining at least a portion of the plurality of prompt-enriching tokens comprises:

detecting an entity in the user query; and based on the detected entity, performing a search operation against the user profile, the database comprising the historical trends associated with the user profile, or the database comprising data for the plurality of users.

16. One or more computer storage media having computer-executable instructions embodied thereon that, when executed by one or more processors, cause a computing system to perform operations comprising:

receiving, in association with a user profile engaging in gameplay within a gaming computer environment, an input comprising a user query intended for a language model (LM); and in lieu of communicating the user query to the LM:

from the user query, during the gameplay, and using an intermediate language model (LM) layer bidirectionally communicatively coupled to the LM and communicatively coupled to the gaming computer environment, determining prompt-enriching information comprising at least one of: a first indication of a logical assessment of the user query, a second indication of a factual assessment of the user query, a third indication of an intent of the user query, a fourth indication of a comparison of the user query to a database comprising data for a plurality of users, or a fifth indication of historical trends associated with the user profile, wherein the intermediate LM layer comprises a framework evaluator that generates an indication of verisimilitude of the user query, and the prompt-enriching information comprises the indication of verisimilitude;

combining the user query and the prompt-enriching information to generate an enriched user query; and transmitting the enriched user query from the intermediate LM layer to the LM, wherein transmitting the enriched user query to the LM causes the LM to, based on the enriched user query:

generate, during the gameplay, a response to the user query, and update a database comprising the historical trends associated with the user profile.

17. The one or more computer storage media of claim 16, wherein the operations further comprise:

subsequent to transmitting the enriched user query, receiving, from the LM, a response to the enriched user query;

based on the response, updating data for the plurality of users, wherein future prompt-enriching information is determined based on the update; and transmitting an aspect of the response to a user device.

18. The one or more computer storage media of claim 16, wherein the operations further comprise:

converting the user query into a plurality of user tokens; and converting the prompt-enriching information into a plurality of prompt-enriching tokens that have weight values that are higher than weight values of the plurality of user tokens, wherein the enriched user query comprises the plurality of user tokens and the plurality of prompt-enriching tokens have respective weight values.

19. The one or more computer storage media of claim 16, wherein the prompt-enriching information is determined based on legal rules of evidence.

20. The one or more computer storage media of claim 16, wherein the computing system comprises a video game server.

* * * * *